(12) United States Patent
Kiyosue et al.

(10) Patent No.: US 6,609,009 B1
(45) Date of Patent: *Aug. 19, 2003

(54) ELECTRONIC COMPONENT AND RADIO TERMINAL USING THE SAME

(75) Inventors: Kuniaki Kiyosue, Miyazaki (JP); Kazuhiro Takeda, Miyazaki (JP); Hiromi Sakita, Miyazaki (JP); Kenzo Isozaki, Miyazaki (JP); Katsumi Sasaki, Miyazaki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/559,812

(22) Filed: Apr. 26, 2000

(30) Foreign Application Priority Data

Apr. 26, 1999 (JP) ............................ 11-117637
Jun. 29, 1999 (JP) ............................ 11-182869
Jun. 29, 1999 (JP) ............................ 11-182884

(51) Int. Cl.$^7$ .................................................. H04B 1/38
(52) U.S. Cl. ...................... 455/550; 455/90; 455/73; 455/575; 174/261
(58) Field of Search ........................ 455/90, 550, 575, 455/73; 174/261; 336/200, 192, 83; 338/62, 61, 303, 333, 294; 333/185

(56) References Cited

U.S. PATENT DOCUMENTS

| 3,881,162 A | * | 4/1975 | Caddock ...................... 29/593 |
| 4,314,221 A | | 2/1982 | Satou et al. |
| 4,368,447 A | | 1/1983 | Inomata et al. |
| 4,696,100 A | | 9/1987 | Yamamoto et al. |
| 4,984,130 A | | 1/1991 | Düll et al. |
| 5,091,212 A | | 2/1992 | Sakai et al. |
| 5,252,781 A | * | 10/1993 | Shirai et al. ................ 174/261 |
| 5,275,661 A | | 1/1994 | Nakagawa et al. |
| 5,398,400 A | | 3/1995 | Breen |
| 5,532,667 A | | 7/1996 | Haertling et al. |

(List continued on next page.)

FOREIGN PATENT DOCUMENTS

| DE | 2518279 | 11/1976 |
| DE | 36 19 212 | 12/1987 |
| DE | 39 41 917 | 6/1990 |
| DE | 42 08 117 | 5/1993 |
| EP | 0 588 306 | 3/1994 |
| EP | 0 785 559 | 7/1997 |
| EP | 0 989 568 | 3/2000 |
| GB | 141735 | 11/1975 |
| JP | 57-117636 | 7/1982 |
| JP | 58-191609 | 12/1983 |

(List continued on next page.)

OTHER PUBLICATIONS

Official Action from JPO (11–182869) dated Mar. 19, 2002.
Official Action from JPO (11–182884) dated Mar. 19, 2002.
Japanese Office Action, application No. 11–182884, dated Jun. 26, 2002.

(List continued on next page.)

Primary Examiner—Tranh Cong Le
Assistant Examiner—Lana Le
(74) Attorney, Agent, or Firm—RatnerPrestia

(57) ABSTRACT

An electronic component which comprises a substrate, conductive film on the surface of the substrate, a groove created on the conductive film, a protective material covering the groove, and terminals and on both ends of the substrate. Lengths P1 to P8 of the terminals and, the surface roughness and materials of the terminals and, and configuration of the protective material are specified for providing an electronic component and radio terminal with at least one of improved productivity, mountability, and characteristics.

52 Claims, 16 Drawing Sheets

U.S. PATENT DOCUMENTS

| | | | |
|---|---|---|---|
| 5,764,126 A | | 6/1998 | Kanetaka et al. |
| 5,805,043 A | | 9/1998 | Bahl |
| 5,870,289 A | * | 2/1999 | Tokuda et al. .............. 174/260 |
| 5,874,883 A | * | 2/1999 | Uemura et al. ............. 336/200 |
| 5,963,119 A | * | 10/1999 | Takeda et al. .............. 336/196 |
| 6,087,920 A | * | 7/2000 | Abramov .................... 336/192 |
| 6,131,041 A | * | 10/2000 | Takeda et al. .............. 455/550 |
| 6,161,276 A | * | 12/2000 | Droz ......................... 29/602.1 |

FOREIGN PATENT DOCUMENTS

| | | |
|---|---|---|
| JP | 59-98508 | 6/1984 |
| JP | 60-144922 | 7/1985 |
| JP | 60-208811 | 10/1985 |
| JP | 60-257118 | 12/1985 |
| JP | 61-264707 | 11/1986 |
| JP | 1-199418 | 8/1989 |
| JP | 1-238003 | 9/1989 |
| JP | 1-238007 | 9/1989 |
| JP | 03-027003 | 2/1991 |
| JP | 03-270003 | 12/1991 |
| JP | 5-129133 | 5/1993 |
| JP | 05-242457 | 9/1993 |
| JP | 05-243457 | 9/1993 |
| JP | 5299250 | 11/1993 |
| JP | 5-343234 | 12/1993 |
| JP | 06-208924 | 7/1994 |
| JP | 6-215950 | 8/1994 |
| JP | 7-10913 | 1/1995 |
| JP | 7-74023 | 3/1995 |
| JP | 07-086041 | 3/1995 |
| JP | 7-297033 | 11/1995 |
| JP | 7-307201 | 11/1995 |
| JP | 08-017671 | 1/1996 |
| JP | 08-153414 | 6/1996 |
| JP | 09-092977 | 4/1997 |
| JP | 10-012421 | 1/1998 |
| JP | 10-116730 | 5/1998 |
| JP | 10-116738 | 5/1998 |
| JP | 10-116739 | 5/1998 |
| JP | 10-116740 | 5/1998 |
| JP | 10-125534 | 5/1998 |
| JP | 10-284342 | 10/1998 |
| JP | 11-003817 | 1/1999 |
| JP | 11-003820 | 1/1999 |
| JP | 11-016732 | 1/1999 |
| JP | 11-026284 | 1/1999 |
| JP | 11-121234 | 4/1999 |
| JP | 11-162742 | 6/1999 |
| WO | WO 96/42094 | 12/1996 |

OTHER PUBLICATIONS

Search Report for corresponding German Patent Application No. 10020457.0 dated Jan. 18, 2001.

"Chip Inductors for High–Frequency Applications" National Technical Report vol. 42, No. 4 Aug. 1996 pp. 26–34.

Final Office Action for Japanese Patent Application No. 11–182884 dated Aug. 28, 2002.

* cited by examiner

Surface roughness (μm)

(a)

(b)

ELECTRONIC COMPONENT AND RADIO TERMINAL USING THE SAME

BACKGROUND OF THE INVENTION

1. Field of the Invention

The present invention relates to the field of electronic components particularly suitable for high frequency circuits used in electronic apparatuses, such as for mobile communications, their manufacturing methods, and radio terminals using these types of electronic components. More particularly, the present invention relates to electronic components provided with a conductive film on an insulated substrate, and radio terminals using such electronic components.

2. Description of the Prior Art

FIG. 17 is a side view of a conventional inductor element. The conventional inductor element comprises a quadratic prism or cylindrical substrate 1, a conductive film 2 formed on the substrate 1, a groove 3 created on the conductive film 2, and a protective material 4 made of an electro-deposited film laminated on the conductive film 2.

These types of electronic components are given predetermined characteristics by adjusting the spacing between the grooves 3.

The Japanese Laid-open Patents Nos. H7-307201, H7-297033, H5-129133, H1-238003, H5-299250, and H7-297033; and Utility Model Laid-open Publication No. S57-117636 disclose conventional electronic components. However, the mountability or electrical characteristics of the conventional electronic components may degrade if their size reduce. In addition, when forming the protective material 4 with an electro-deposited film, stress may be applied to the conductive film 2 through the electro-deposited film during manufacturing or when mounting the electronic component because the mechanical strength (rigidity) of the electro-deposited film itself is small. This may result in breaking of the conductive film 2, thus degrading the characteristics of the electronic component. In particular, when the conductive film 2 is coiled, the use of electro-deposited film for the protective material 4 has a significant detrimental effect such as short circuiting and breaking of the coiled conductive film 2. With even smaller electronic components being demanded in response to miniaturization of recent apparatuses, this problem is becoming more acute.

SUMMARY OF THE INVENTION

An electronic component of the present invention comprises a substrate, a conductive film disposed on the substrate, a groove created on the conductive film, and a pair of terminals disposed on both ends of the substrate. A length L1 of the electronic component in a direction toward the pair of terminals (a lengthwise direction) and length P5 and P6 of cross sections in the lengthwise direction of the pair of terminals satisfy the next relations:

0.07<P5/L1<0.35

0.07<P6/L1<0.35.

A radio terminal of the present invention employs the above electronic component of the present invention in at least one of a oscillating circuit, filter circuit, antenna, matching circuit between stages, and their peripheral circuits.

DESCRIPTION OF THE PREFERRED EMBODIMENT

Preferred embodiments of an electronic component and radio terminal of the present invention are described below, taking an inductor element as an example.

Figure 1A:
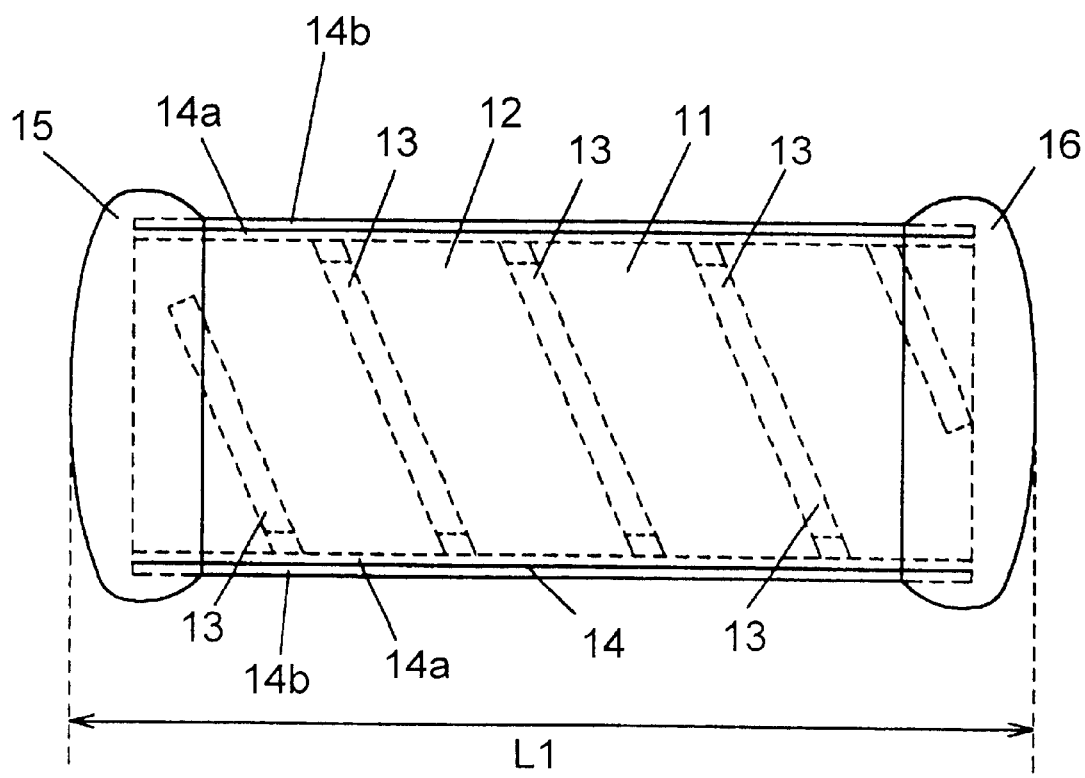
FIGS. 1(a) and 1(b) show an inductor element in accordance with a preferred embodiment of the present invention.
Figure 1B:
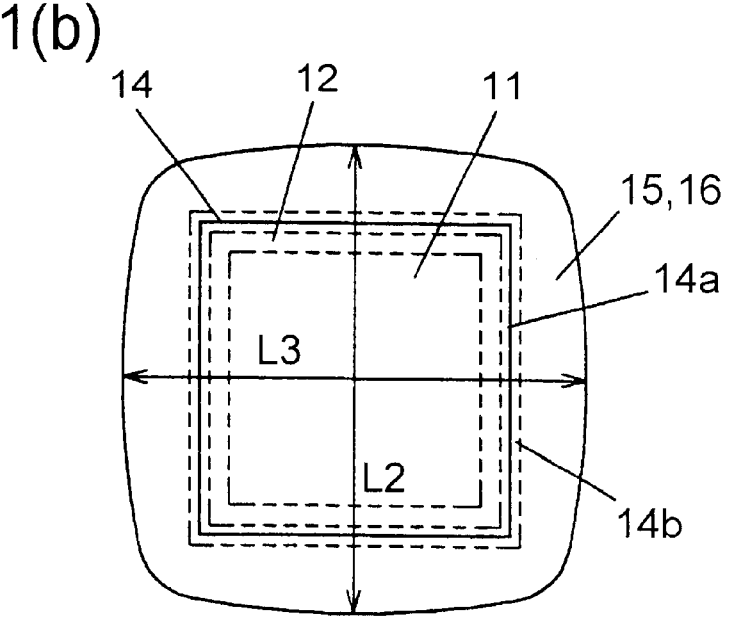

As shown in FIGS. 1(a) and 1(b), a substrate 11 is typically made such as by pressing and extruding an insulating material.

A conductive film 12 is formed on the substrate 11 by plating, sputtering, CVD, vacuum deposition, or the like.

A groove 13 is created on the substrate 11 and conductive film 12 by applying a laser beam, by mechanical cutting using a whetstone, or formed by selective etching using a etching resist or the like to the conductive film 12.

A protective material 14 applied to the substrate 11 and the groove 13 of the conductive film 12 consists of two layers 14a and 14b.

Terminals 15 and 16 are formed on both ends of the substrate 11.

The inductor element in the preferred embodiment of the present invention has a practical usable frequency band of 1 to 6 GHz, which is a high frequency band, and also has extremely high Q (20 or above: 800 MHz).

A length L1, width L2, and height L3 of this inductor element are preferably as follows:

L1=0.2–2.0 mm (preferably 0.3–0.8 mm)
L2=0.1–1.0 mm (preferably 0.1–0.4 mm)
L3=0.1–1.0 mm (preferably 0.1–0.4 mm)

(Dimensional tolerance of L1, L2, and L3 is preferably 0.2 mm or less for each.)

If L1 is 0.2 mm or less, the required inductance may not be achievable. On the other hand, if L1 exceeds 2.0 mm, the size of elements may be too large to allow miniaturization of circuit boards on which electronic circuits or the like (hereafter referred to as circuit boards) are formed, and may also lead to inability to reduce the size of electronic apparatuses using such circuit boards.

If L2 and L3 are 0.1 mm or less, the mechanical strength of the element itself becomes too low, and may result in breaking of the element if mounted on the circuit boards. If L2 and L3 are 1.0 mm or more, the size of the element is too large to allow miniaturization of circuit boards and apparatuses.

Next, each part of the inductor element as configured above is described in details.

First, a shape of the substrate 11 is described.

Figure 2:
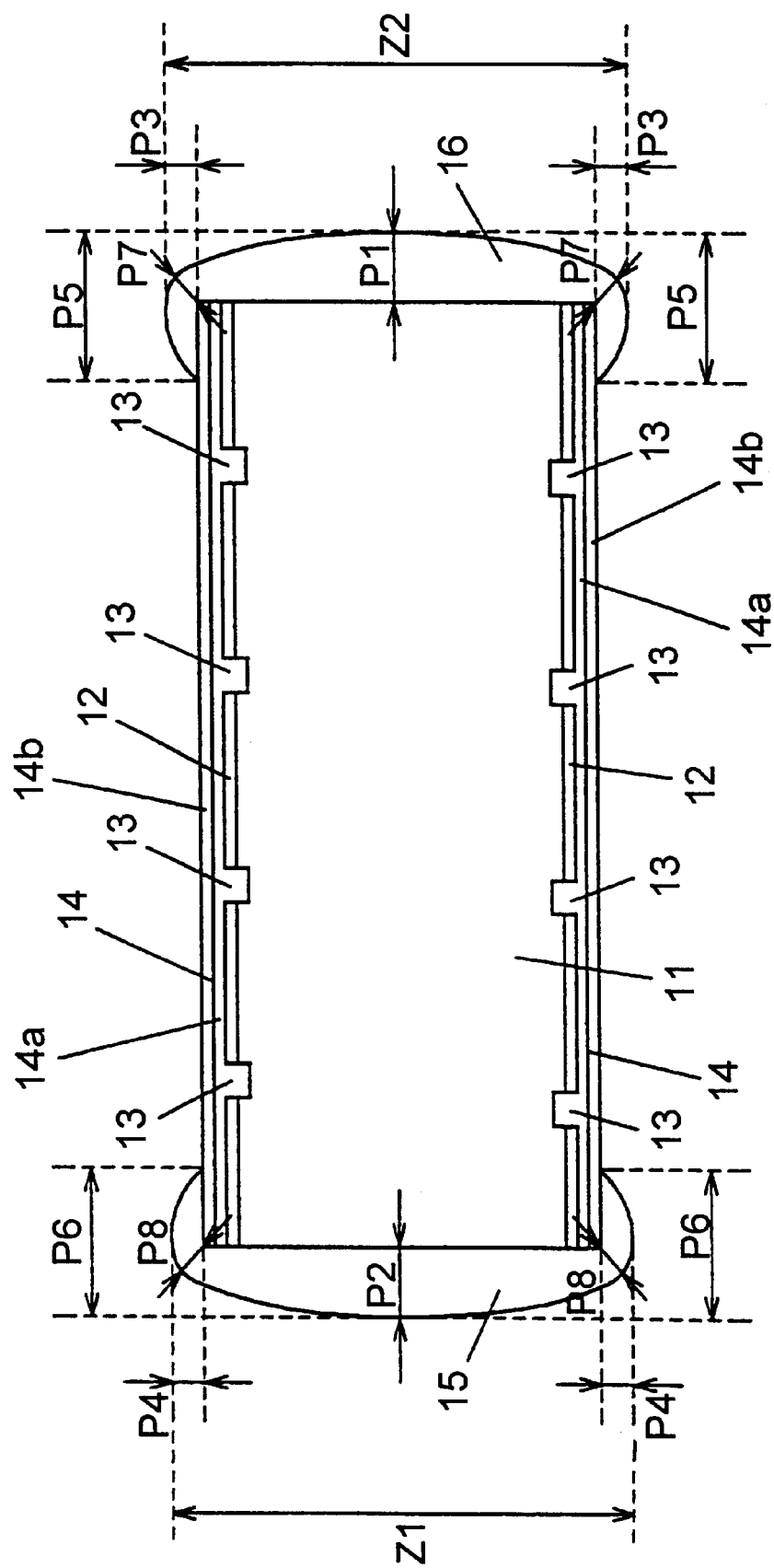
FIG. 2 is a sectional side view of the inductor element in accordance with the preferred embodiment of the present invention.

The substrate 11 preferably has a prism or cylindrical shape. The prism substrate 11, as shown in FIGS. 1(a), 1(b), and 2, improves mountability and prevents tip-over of the element. In particular, the quadratic prim substrate 11 in prism substrates significantly improves mountability and facilitates aligning of the substrate 11 on circuit boards. The prism substrate 11 preferably has a bottom face of a right angle square for further improving mountability. The prism substrate 11 also achieves extremely simple configuration, increasing productivity and significantly reducing cost.

The cylindrical substrate 11 enables to accurately set dimensions such as the depth of a groove to be created on the conductive film 12 formed on the substrate 11, as described later, such as by applying laser to the conductive film 12. This reduces deviations in coil characteristics.

Chamfering of the substrate 11 is described next with reference to FIG. 3.

Figure 3:
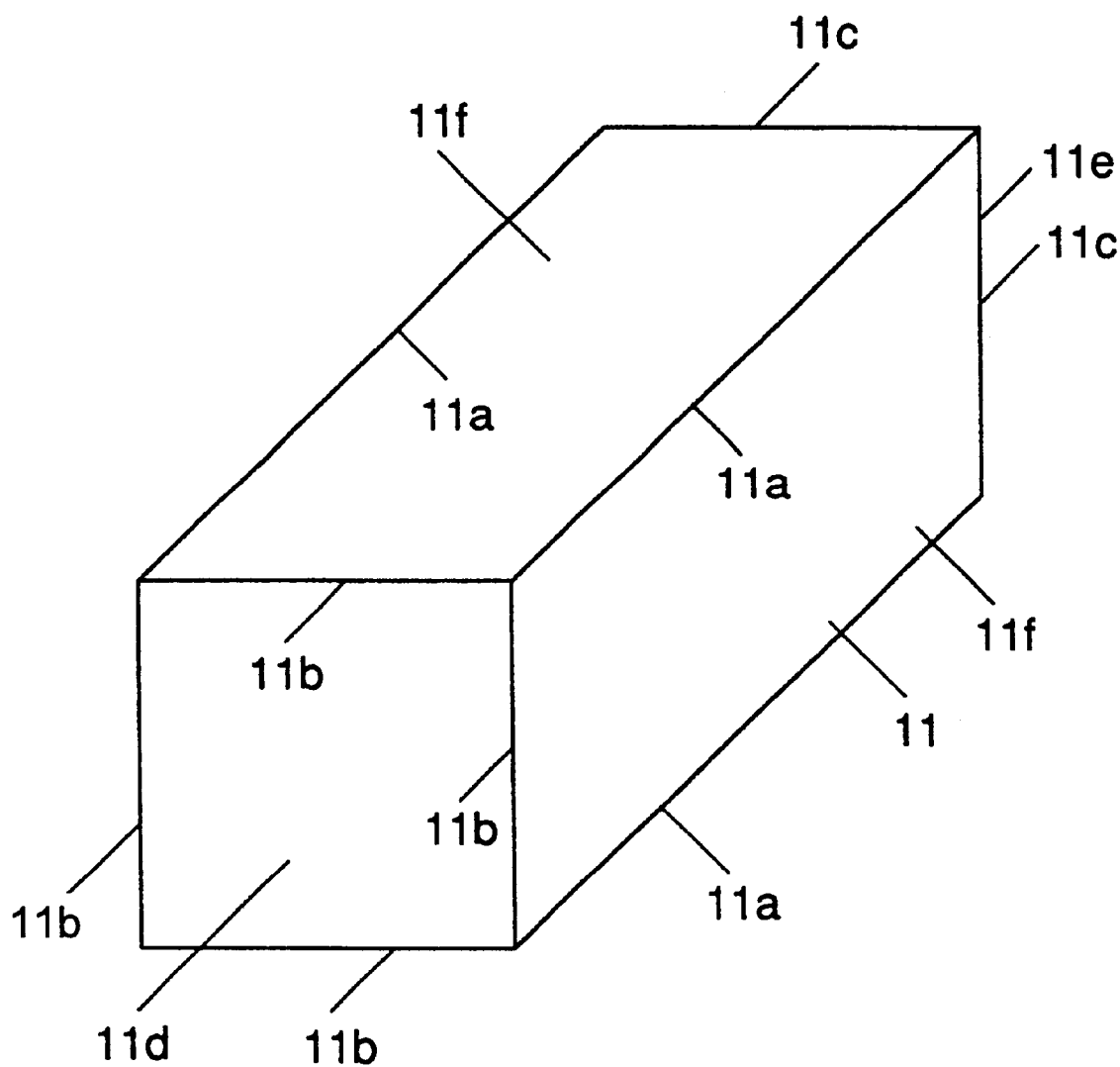
FIG. 3 is a perspective of a substrate used for the inductor element in accordance with the preferred embodiment of the present invention.

FIG. 3 is a perspective of the substrate 11. Comers 11b and 11c of the substrate 11 are chamfered, and a curvature radius R1 of the chamfered comers 11b and 11c, and a curvature radius R2 of a corner 11a preferably satisfy the following conditions:

0.01<R1<0.15 (unit:mm); and
0.01<R2 (unit:mm).

If R1 is 0.01 mm or less, sharp corners 11b and 11c may be chipped with just a small impact. Such chipping may degrade characteristics. If R1 is 0.15 mm or more, excessively round corners 11b and 11c may cause a so-called "Manhattan defect" (details described later), causing a defect. Furthermore, if R2 is 0.01 mm or less, burring may likely to occur at the corner 11a. This may cause a great difference in thickness of the conductive film 12 having a large influence on characteristics of the element at between a corner 11a and a flat area 11f, magnifying variations in element characteristics.

Materials for the substrate 11 are described next.

The substrate 11 is preferably made of materials satisfying the following characteristics:

Volume resistivity: $10^{13}$ ohms·m min. (preferably $10^{14}$ ohms·m or above);

Thermal expansion coefficient: $5\times10^{-4}$ m/° C. max. (preferably $2\times10^{-5}$/° C. or below)

[Thermal expansion coefficient at 20° C. to 500° C.]

Dielectric constant: 12 max. at 1 MHz (preferably 10 or less);

Bending strength: 1300 kg/cm$^2$ min. (preferably 2000 kg/cm$^2$ or above); and

Density: 2–5 g/cm$^3$ (preferably 3–4 g/cm$^3$).

If the volume resistivity of the material of the substrate 11 is $10^{13}$ ohms·m or below, a current also flows to the substrate 11 in addition to the conductive film 12, establishing a parallel circuit. This reduces self resonance frequency $f_0$ and Q, which is unsuitable for a high frequency element.

If the thermal expansion coefficient is $5\times10^{-4}$/° C. or above, the substrate 11 may crack by thermal impact. More specifically, the thermal expansion coefficient of $5\times10^{31\ 4}$/° C. or above may cause local temperature rise in the substrate 11, and may cause a crack, because the groove 13 is formed using laser beam or whetstone, as described above. The occurrence of cracks may drastically be suppressed by using a material with the thermal expansion coefficient satisfying the aforementioned conditions for the substrate 11.

If the dielectric constant is 12 or above at 1 MHz, the self resonance frequency $f_0$ and Q decrease, which is unsuitable for the high frequency element.

If the bending strength is 1300 kg/cm$^2$ or below, the element may break at mounting it on circuit boards using a mounting machine.

If the density is 2 g/cm$^3$ or below, the water absorption of the substrate 11 increases, and significantly degrades characteristics of the substrate 11, deteriorating the characteristics of the element.

If the density is 5 g/cm$^3$ or above, weight of the substrate 11 becomes too heavy, causing problems in mountability. In particular, if the density is set within the aforementioned range, the substrate 11 has small water absorption, preventing penetration of water into the substrate 11, and is light in weight which is convenient for mounting onto a circuit board typically using a chip mounting machine.

By specifying volume resistivity, thermal expansion coefficient, dielectric constant, bending strength, and density of the substrate 11, a decrease in self resonance frequency $f_0$ and Q is preventable, enabling to use the element for high frequency appliances. In addition, the occurrence of cracks on the substrate 11 by thermal impact can be suppressed. This allows to decrease the defect rate, and to mount the element on circuit boards using a mounting machine or the like, and thus achieve significant effects including improvement of productivity.

One of materials which satisfy the above characteristics is a ceramic material mainly consisting of alumina. However, a ceramic material mainly consisting of alumina may not always be able to achieve the above characteristics. In other words, the characteristics may differ by pressing pressure, firing temperature or the like during production process, and additives. Accordingly, manufacturing conditions need to be adjusted as required. Specific manufacturing conditions for processing the substrate 11 include: Pressing pressure of 2 to 5 t, firing temperature of 1500–1600° C., and firing time of 1–3 hours. An exemplary alumina material is 92 wt. % or more $Al_2O_3$, 6 wt. % or less $SiO_2$, 1.5 wt. % or less MgO, 0.1% or less $FeO_3$, and 0.3 wt. % or less $Na_2O$.

The substrate 11 may also be made of a magnetic material such as ferrite or the like materials. If the substrate 11 is made of the magnetic material such as ferrite, an element with high inductance (18 nH–50 nH) can be obtained. In this case, ferrite with high resistance whose volume resistivity satisfies the aforementioned condition is preferably used.

Next, the surface roughness of the substrate 11 is described.

The term 'surface roughness' in the following descriptions refers in every case to the average surface roughness. Descriptions of roughness of the conductive film 12 also refer to the average surface roughness.

Figure 4:
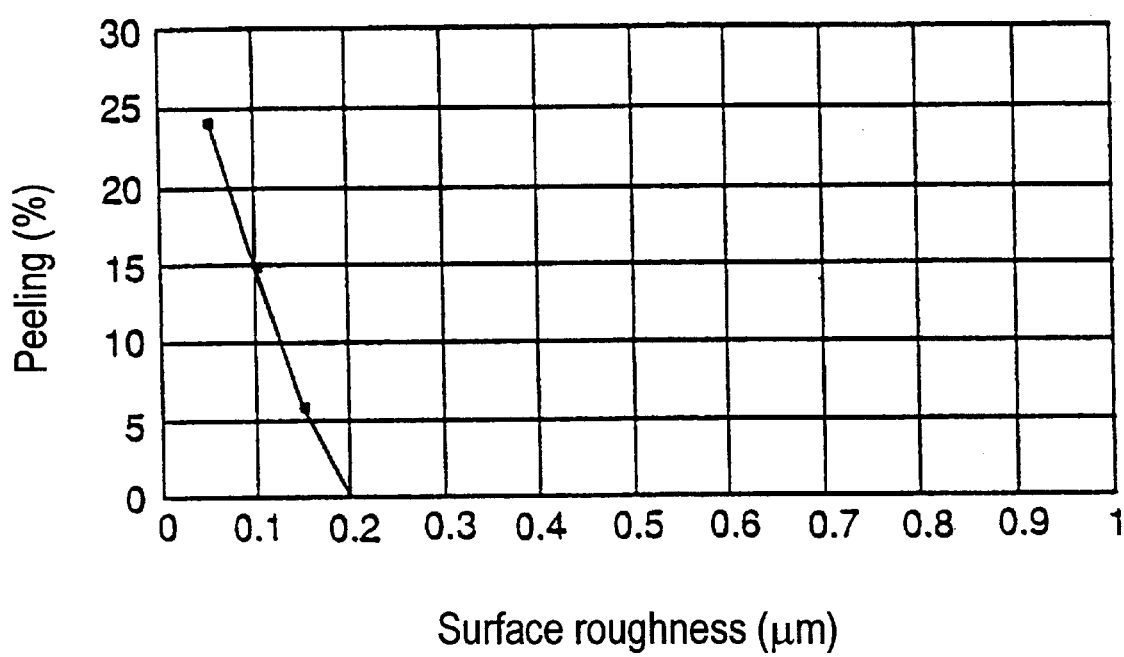
FIG. 4 is a graph illustrating the relation between the surface roughness of the substrate and the occurrence of peeling of the conductive film used for the inductor element in accordance with the preferred embodiment of the present invention.

The surface roughness of the substrate 11 is approximately from 0.15 to 0.5 μm, preferably from 0.2 to 0.3 μm. FIG. 4 is a graph illustrating the surface roughness of the substrate 11 and the occurrence of peeling of the conductive film 12. FIG. 4 shows the results of the next experiment.

The substrate 11 and conductive film 12 are made of alumina and copper respectively. Several samples of the substrate 11 with different surface roughnesses are prepared, and the conductive film 12 is formed on each sample with the same conditions. The samples are washed using ultrasonic wave, and then the surface of the conductive film 12 is observed to identify any peeling of the conductive film 12.

The surface roughness of the substrate 11 is measured with a surface roughness measuring instrument (Model 574A, Tokyo Seimitsu Surfcom Co., Ltd.). The radius R of a tip of the measuring needle is 5 μm. It is apparent from the results that the occurrence of peeling on the conductive film 12 formed on the substrate 11 is about 5% or less when the average surface roughness (Ra) is 0.15 μm or more, and thus satisfactory bonding strength between the substrate 11 and conductive film 12 is achievable.

Furthermore, peeling of the conductive film 12 rarely occurs when the surface roughness of the substrate 11 is 0.2 μm or above. Accordingly, the surface roughness of the substrate is preferably 0.2 μm or above. Peeling of the conductive film 12 markedly increases the degradation of characteristics of the element, and the occurrence of peeling should ideally be kept at 5% or below with respect to yield.

Figure 5:
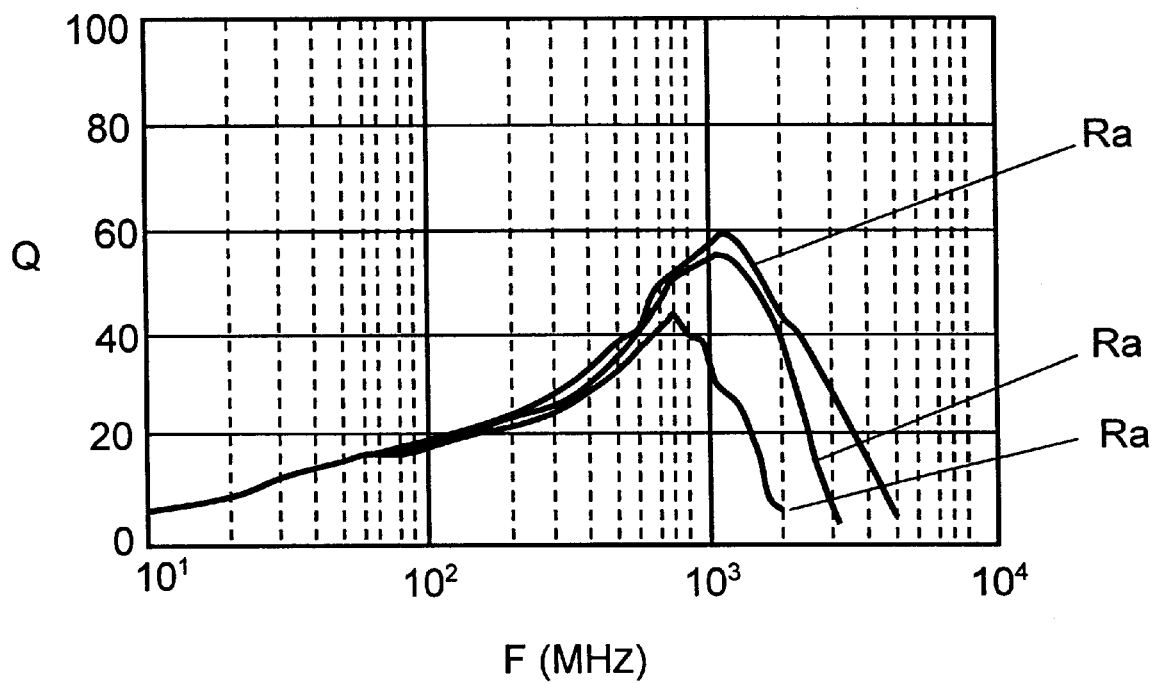
FIG. 5 is a graph illustrating the relation between the frequency and Q value against the surface roughness of the substrate used for the inductor element in accordance with the preferred embodiment of the present invention.

FIG. 5 is a graph illustrating the relation between frequency and Q against the surface roughness of the substrate 11 used for the inductor element in the preferred embodiment of the present invention. FIG. 5 shows the results of the next experiment.

First, several samples of the substrate 11 with the surface roughness of 0.1 μm or below, the substrate 11 with the surface roughness from 0.2 to 0.3 μm, and the substrate 11 with the surface roughness of 0.5 μm or above are prepared.

A conductive film made of the same material (copper) and having the same thickness is formed on each sample. Then, the Q at a predetermined frequency F is measured.

It is apparent from FIG. 5 that the Q decreases, probably caused by change of the film structure of the conductive film 12, when the surface roughness of the substrate 11 is 0.5 μm or above. In particular, the Q drops significantly in the high frequency bands. The self resonance frequency $f_0$ (Q is 0) also shifts to a low frequency when the surface roughness of the substrate 11 is 0.5 μm. Accordingly, the surface roughness of the substrate 11 is preferably 0.5 μm or below with respect to the Q and self resonance frequency $f_0$.

With consideration to both bonding strength of the conductive film 12 and substrate 11, and the Q and self resonance frequency $f_0$ of the conductive film 12, the surface roughness of the substrate 11 is preferably from 0.15 μm to 0.5 μm, and preferably from 0.2 to 0.3 μm.

In the present embodiment, the bonding strength between the conductive film 12 and substrate 11 is adjusted by changing the surface roughness of the substrate 11. The bonding strength between the conductive film 12 and substrate 11 may also be improved by providing an intermediate layer comprising at least one of single carbon, carbon containing a predetermined element, a metallic material, single Cr, and alloy of Cr and other metal, without adjusting the surface roughness. Further increased bonding strength between the conductive film 12 and substrate 11 is apparently achievable by adjusting the surface roughness of the substrate 11 and laminating the intermediate layer and the conductive film 12 on the substrate 11.

Next, the conductive film 12 is described.

As for the conductive film 12, a material which has the Q of 20 or above against high frequency signals over 800 MHz, and has self resonance frequency from 1 to 6 GHz is preferable. For obtaining the conductive film 12 with such characteristics, materials and manufacturing methods may need to be specified.

The conductive film 12 is detailed below.

Conductive materials such as copper, silver, gold, and nickel may be used for the conductive film 12. A specific element may be added to these materials for improving weather resistance. An alloy of a conductive material and non-metal material may also be used. With consideration to cost, corrosion resistance, and workability; copper and its alloy are preferable. If copper or the like is used for the conductive film 12, a base layer is formed on the substrate 11 by electroless plating, and then a predetermined copper film is formed on the base layer by electroplating to complete the conductive film 12. For using an alloy for the conductive film 12, sputtering, vacuum deposition, printing, or the like may preferably be used.

If the conductive film 12 is formed of copper, for example, as in the present embodiment, and the film is made thick to suppress self heat generation, the relation between a width K1 of the groove 13 to be formed on the conductive film 12 and a width K2 of the conductive film 12 between the grooves 13 preferably satisfies the next conditions:

30 μm>K1>10 μm; and

300 μm>K2>10 μm.

In particular, electric resistance can be made smaller if the inductor element satisfies the above K1 and K2 ranges, and also the following conditions, as described before, for the length L1, width L2, and height L3:

L1=0.2–2.0 mm (preferably 0.3–0.8 mm)

L2=0.1–1.0 mm (preferably 0.1–0.4 mm)

L3=0.1–1.0 mm (preferably 0.1–0.4 mm)

(Dimensional tolerance of each L1, L2, and L3 is preferably 0.02 mm or less). In addition, in the above condition, the groove 13 can be formed accurately on the conductive film 12, even the conductive film 12 is thickened. The conductive film 12 may be made of a single layer, but it may also be configured with multiple layers. In other words, different materials may be laminated to form the conductive film. For example, a copper film may first be formed on the substrate 11, and then a metal film with good weather resistance (such as nickel) may be laminated on the copper film to prevent corrosion of copper to improve weather resistance.

The conductive film 12 may be formed by printing, plating (electroplating or electroless plating), sputtering, CVD, vacuum deposition, or the like. In these methods, plating is preferable with respect to mass production and less deviations in the film thickness.

Figure 6:
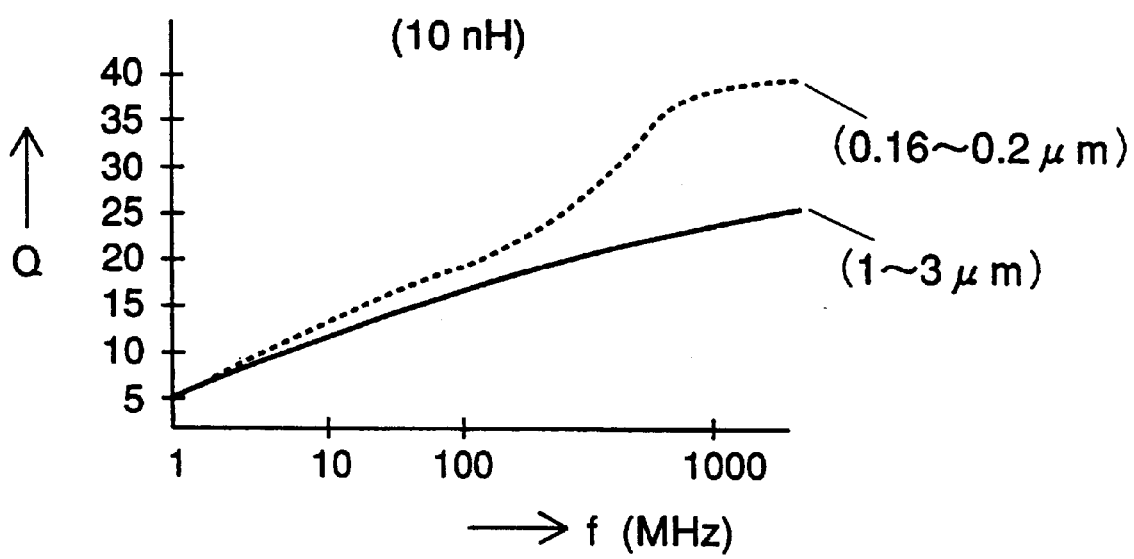
FIG. 6 is a graph illustrating the relation between the frequency and Q against the surface roughness of a conductive film used for the inductor element in accordance with the preferred embodiment of the present invention.

The surface roughness of the conductive film 12 is preferably 1 μm or less, and preferably 0.2 μm or less. If the surface roughness of the conductive film 12 exceeds 1 μm, a skin effect reduces the Q at high frequency bands. FIG. 6 is a graph illustrating the frequency and Q against the surface roughness of the conductive film used in the inductor element in the embodiment of the present invention.

FIG. 6 shows the results of the next experiment.

First, several samples of the conductive film 12 made of copper with different surface roughness are formed on the substrate 11 made of the same material with the same size and surface roughness. Then, frequency and Q of each sample are measured. It is apparent from FIG. 6 that the Q at high frequencies drops when the surface roughness of the conductive film 12 is 1 μm or above. On the other hand, the Q particularly at high frequencies is extremely high when the surface roughness of the conductive film 12 is 0.2 μm or less.

Accordingly, the surface roughness of the conductive film 12 is preferably 1.0 μm or less, and preferably 0.2 μm or less for reducing the skin effect of the conductive film 12. In particular, the Q in high frequencies may be improved when the surface roughness of the conductive film 12 is less than 0.2 μm.

The bonding strength of the conductive film 12 and substrate 11 is preferably above the degree that no peeling of the conductive film 12 from the substrate 11 occurs after heating the substrate 11 at 400° C. for a few seconds. Usually, when the element is mounted on a substrate, 200° C. or higher temperature may be applied to the element by a heat generated by itself or by a heat of other components. Accordingly, if no peeling of the conductive film 12 from the substrate 11 occurs at 400° C., no degradation in characteristics of the element occurs even the heat is applied to the element.

Figure 7:
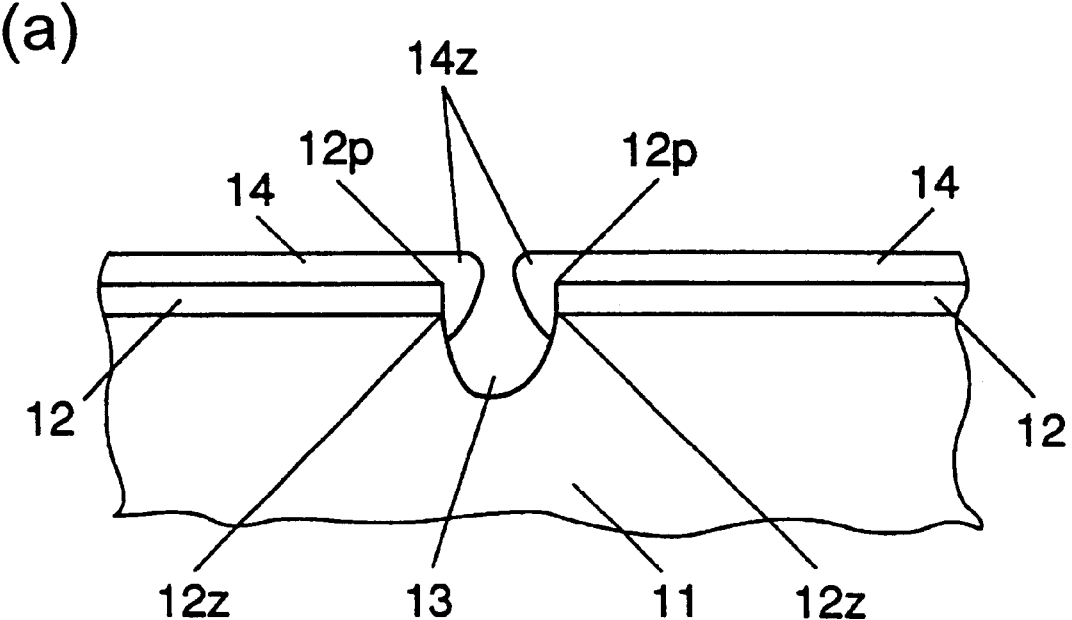
FIG. 7 is a magnified sectional view of a part at which a protective material of the inductor element is provided in accordance with the preferred embodiment of the present invention.
Figure 7:
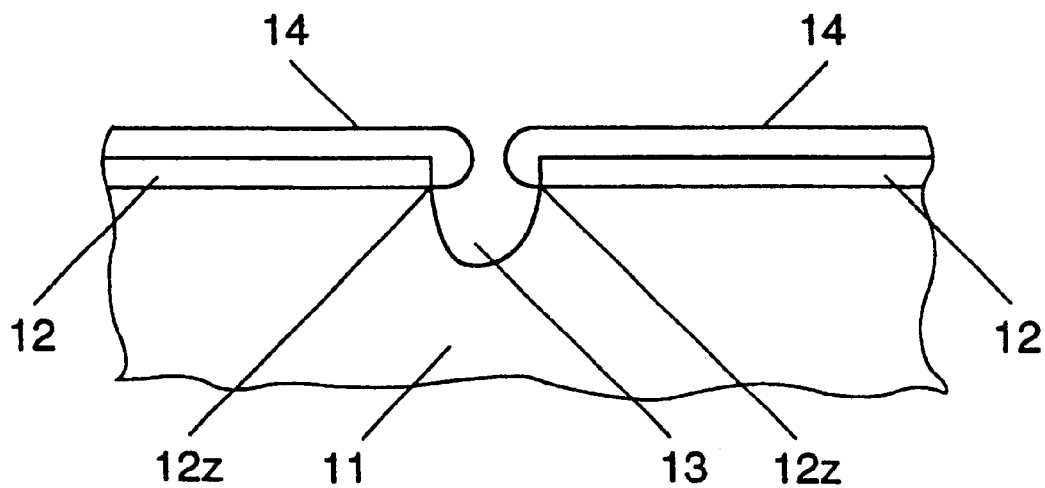

Next, the protective material 14 is described with reference to FIGS. 2 and 7.

The protective material 14 is preferably made by laminating multiple insulating layers. For example, the electro-deposited film 14a is directly formed on the conductive film 12, and then another insulating layer 14b (e.g. epoxy resin) is formed on the electro-deposited film 14a. This configuration allows to securely cover a corner 12p formed at a boundary between the conductive film 12 and groove 13 in a relatively uniform manner, enabling to reduce the possibility of degradation in electrical characteristics due to electrical discharge or short circuiting between the corners. However, the formation of only the electro-deposited film 14a may have a problem in rigidity or durability of the electro-deposited film 14a itself. For addressing this problem, the insulating layer 14b with greater rigidity and durability is formed on the electro-deposited film 14a to improve both electrical characteristics and durability.

The rigidity of the electro-deposited film 14a may be improved by dispersing metal oxides (preferably, titanium oxide) particles, carbon particles, or the like in the electro-deposited film 14a.

The thickness of the electro-deposited film 14a is preferably from 10 to 30 μm. If the thickness is 10 μm or below, insulation resistance against nearby components after being mounted decreases, and may cause changes in inductance. If the thickness exceeds 30 μm, the flatness of the surface of the protective material 14 may degrade, causing drop in the self resonance frequency $f_0$ and Q.

A specific material for the electro-deposited film 14a is at least one of resin materials such as acrylic resin, epoxy resin, fluorocarbon resin, urethane resin, and polyimide resin, or their modified resins. When cation type or anion type is selected for the electro-deposited film 14a, the type may preferably be determined based on materials used for the conductive film 12, and the purpose of use of the inductor element.

The electro-deposited film 14a may be configured by laminating multiple layers of different materials or single material. Moreover, multiple electro-deposited films may be disposed in parallel on the groove 13. The electro-deposited film 14a preferably has withstand voltage of 20 V or above with the thickness of several tens of microns. In addition, the electro-deposited film 14a preferably has characteristics not to burn out or evaporate at 183° C., which is the melting point of eutectic solder. No defective may occur if the electro-deposited film 14a softens at the temperature higher than 183° C.

As shown in FIG. 7(a), the electro-deposited film 14a is preferably disposed to cover at least a part of both of the conductive film 12 and substrate 11. By disposing the protective material 14 in this way, the conductive film 12 may mostly be covered, and may also significantly reduce the probability of contacting outside air. As a result, corrosion of the conductive film 12 and current leak are preventable. If the electro-deposited film 14a is disposed only on the conductive film 12, as shown in FIG. 7(b), a corner 12z of the conductive film 12 may be exposed with high possibility, causing corrosion of the conductive film 12 in some cases.

Accordingly, as shown in FIG. 7(a), at least a part of the substrate 11 including the corner 12z of the conductive film 12 is also covered with the electro-deposited film 14a for securely protecting the conductive film 12. Also as shown in FIG. 7(a), it is preferable to make a portion 14z of the protective material 14 formed on an outer corner 12p of the conductive film 12 thicker than other area. By making the portion 14z thicker, electric discharge between the corner 12p and other area is preventable, and thus degradation in characteristics of the inductor element is preventable. For making the portion 14z thicker, it is effective to adjust current density and distance to an opposing electrode during electro-deposition.

As for the inductor element used for special purposes, it may be important to increase the bonding strength between the conductive film 12 and electro-deposited film 14a. In this case, the surface of the conductive film 12 is roughened by chemical etching or the like, and the electro-deposited film 14a is preferably disposed on the roughened surface. The Q may drop by roughening the surface of the conductive film 12, as described before, but it may be more important to increase the bonding strength between the electro-deposited film 14a and conductive film 12 than maintaining the same Q for special purposes. The roughness of the conductive film 12 may be determined as appropriate depending on applications of use.

If the conductive film 12 is made of materials containing copper, the electro-deposited film 14a is sometimes unevenly formed. In this case, a metal film such as Ni film may be formed on the conductive film 12, and then the electro-deposited film 14a on this metal film.

Figure 8:
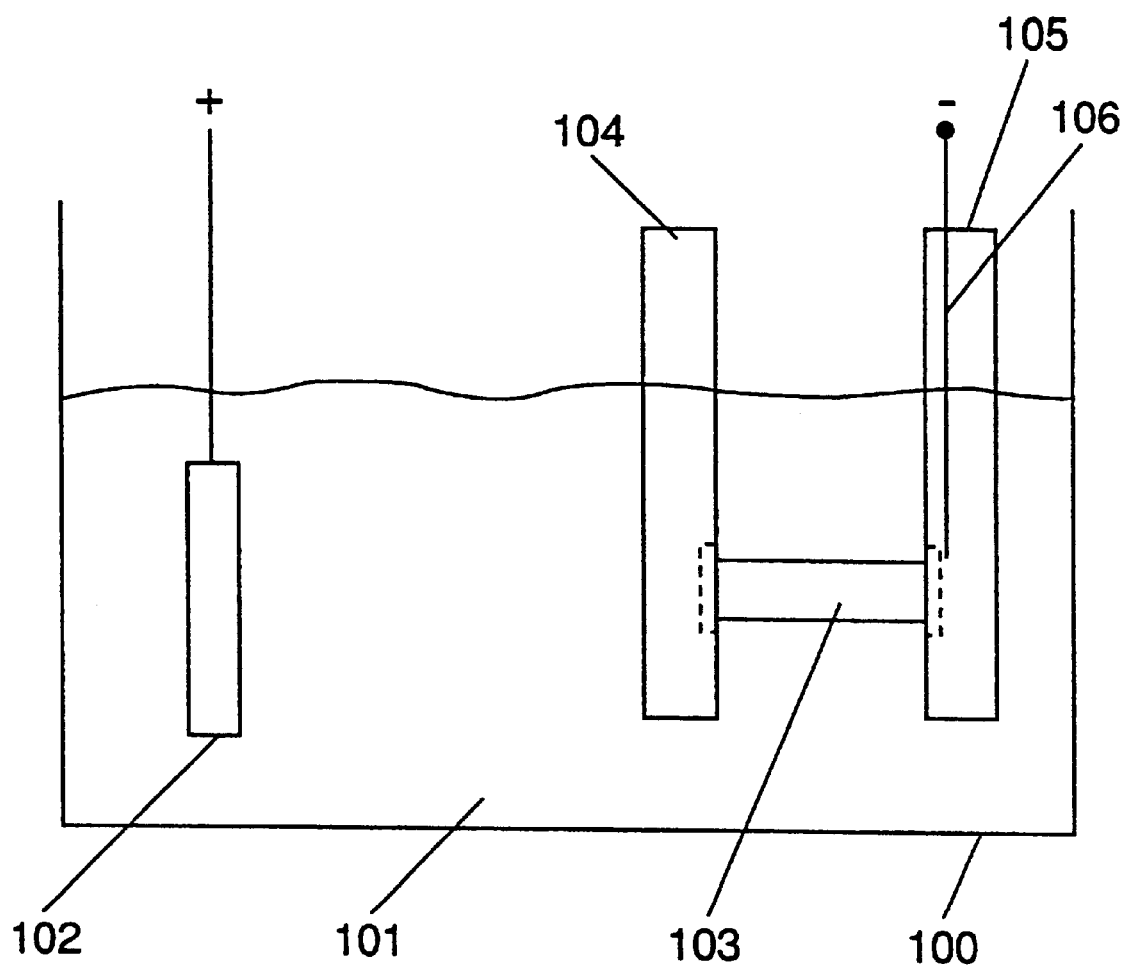
FIG. 8 illustrates a process of providing the protective material to the inductor element in accordance with the preferred embodiment of the present invention.

Next, a method for forming the electro-deposited film 14a is described. As shown in FIG. 8, a solution 101 typically containing water, electro-deposition resin, conditioning agent such as pH conditioner, and other additives is stored in a vessel 100. Support members 104 and 105 respectively have a hole for sticking both ends of the inductor element 103. The support member 105 also has a current-lead 106 which contacts the inductor element 103.

When a predetermined voltage is applied to an electrode 102 and the current-lead 106, an electro-deposited film is formed on the inductor element 103 except for its both ends. This is because terminals 15 and 16 of the inductor element 103 are stuck to the support members 104 and 105, and thus scarcely contact the solution 101. In this preferred embodiment, the terminals 15 and 16 are stuck into the support members 104 and 105, but a mask such as photo resist may be disposed on the terminals 15 and 16.

After manufacturing the inductor element with the electro-deposited film 14a, as described above, the heat treatment is preferably applied to the element. This heat treatment smoothens the surface of the electro-deposited film 14a, reduces the surface roughness, and enables the electro-deposited film 14a to securely cover the conductive film 12. The heat treatment may thin the electro-deposited film 14a on the corner 12p of the conductive film 12. In this case, insulation particles (e.g. metal oxides) may be mixed in the solution 101 to suspend the insulation particles in the electro-deposited film 14a for preventing thinning of the electro-deposited film 14a on the corner 12p of the conductive film 12.

The insulating layer 14b is applied again on the electro-deposited film 14a as configured above. This insulating layer 14b is preferably made of a material which has a greater mechanical strength (particularly greater rigidity) than that of the electro-deposited film 14a. With this configuration, sufficient mechanical strength is achievable even the electro-deposited film 14a with good electrical insulation is made of a material which has low mechanical strength.

Here, the thickness of the insulating layer 14b is preferably from 5 $\mu$m to 20 $\mu$m. If the thickness is less than 5 $\mu$m, the protective material 14 has poor strength, and may damage the coiled conductive film 13 at mounting. This may cause a breaking in the coiled conductive film 13, degrading characteristics. If the thickness exceeds 20 $\mu$m, the surface of the protective material 14 may become round. This may cause less stability in aligning the element after being mounted, and may also cause a pickup error during mounting.

Reasons for limiting the thickness of the insulating layer 14b are detailed next with reference to FIGS. 14 to 16.

Figure 14:
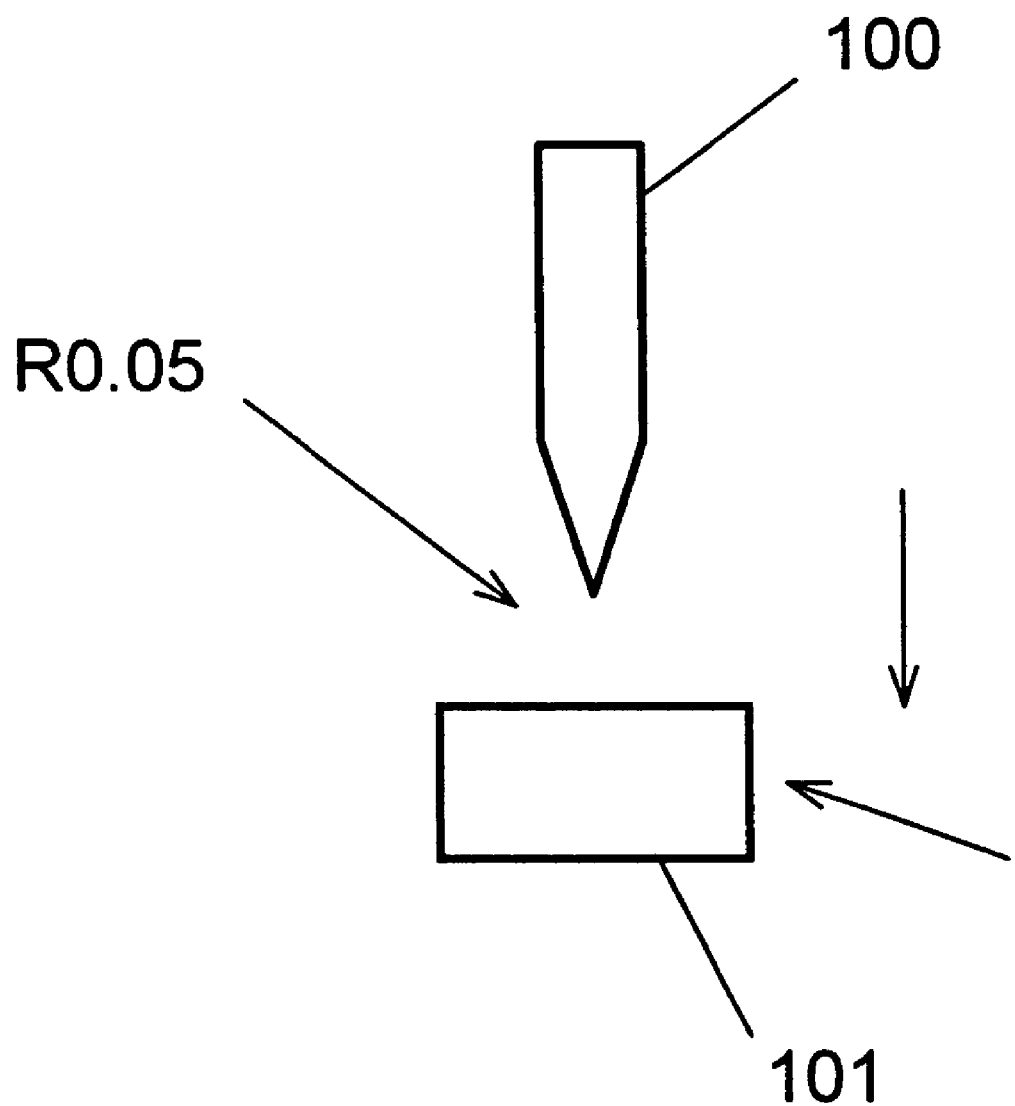
FIG. 14 is a schematic illustrating a method for measuring stress in the electronic component.
Figure 15:
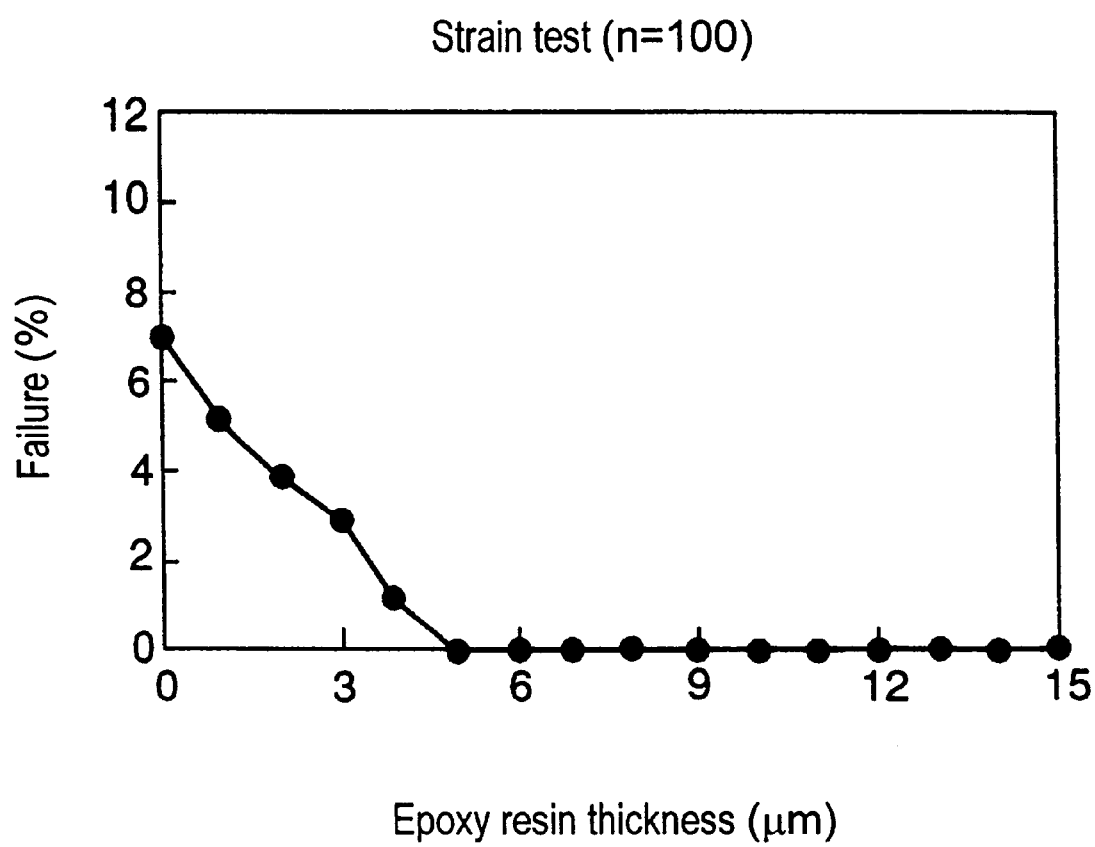
FIG. 15 is a graph illustrating the relation between the film thickness of an insulating layer of the electronic component and occurrence of failure in accordance with the preferred embodiment of the present invention.

As shown in FIG. 14, the occurrence rate of failure is identified when a pin 100 with a tip radius of 0.05 mm is pressed onto an electronic component 101 with a pressure of 0.5 kg. Here, the thickness of the electro-deposited film 14a of the electronic component 101 is 20 $\mu$m, and the thickness of the insulating layer 14b is changed for experiment. It is apparent from results shown in FIG. 15 that almost no defect occurs when the insulating layer 14b is 5 $\mu$m or thicker. Causes of above defect are mainly breaking of the conductive films and short circuits.

Figure 16:
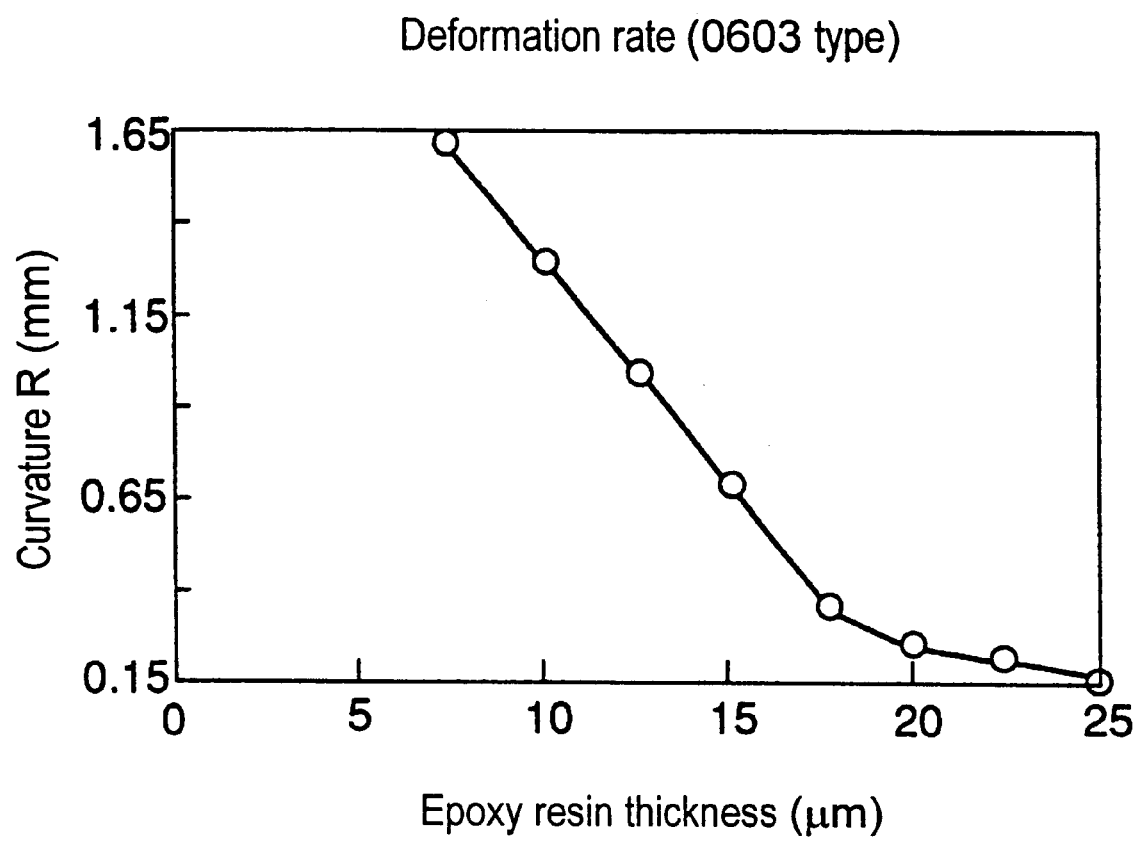
FIG. 16 is a graph illustrating the relation between the film thickness of the insulating layer of the inductor element and surface shape in accordance with the preferred embodiment of the present invention.
Figure 17:
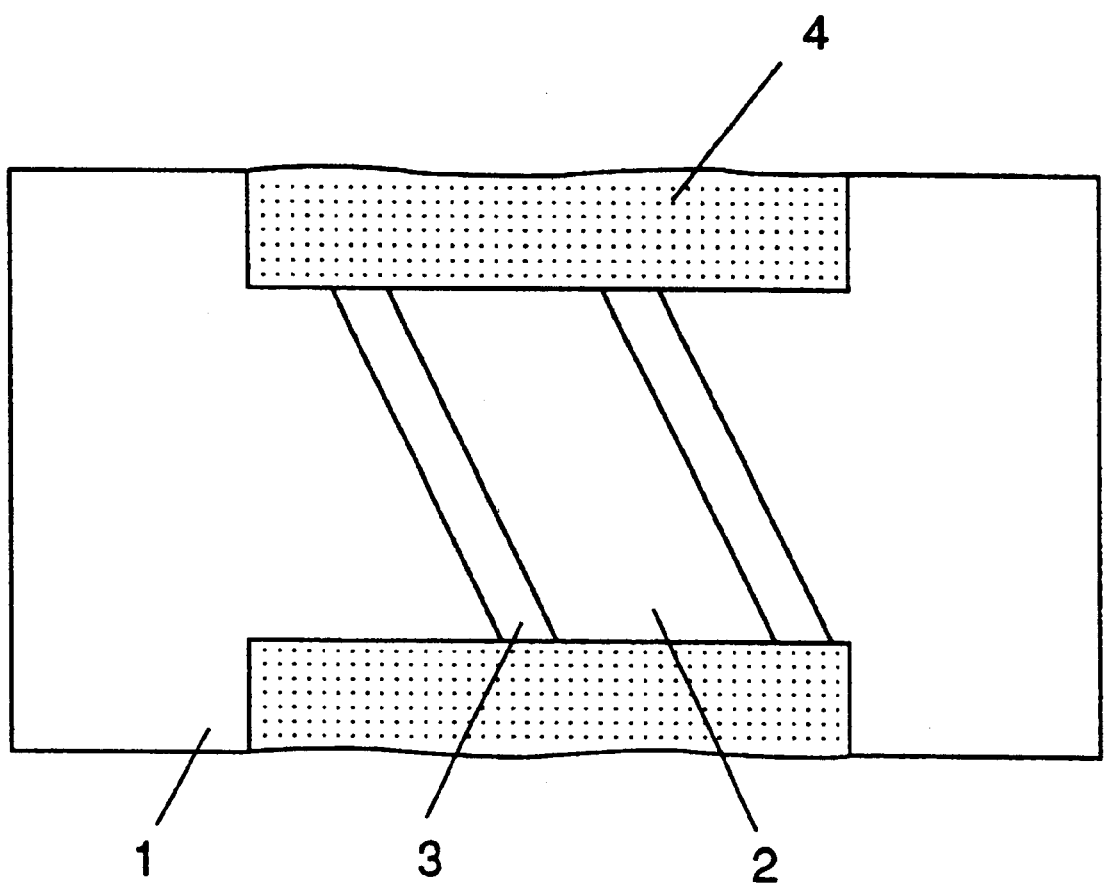
FIG. 17 is a side view of a conventional inductor element.

Next, as shown in FIG. 16, the surface curvature is close to 0.15, which is almost cylindrical, when the insulating layer 14b is 20 $\mu$m or thicker in electronic components having the length 0.6 mm, and height and width 0.3 mm. This extremely degrades pickup characteristics of a mounting machine.

A specific material for the insulating layer 14b may be epoxy resin or acrylic resin. Such materials have relatively high rigidity for ensuring protection of the conductive film 13. The film thickness ratio between the electro-deposited film 14a and insulating layer 14b is preferably from 0.1 to 1.0 for the insulating layer 14b when the thickness of the electro-deposited film 14a is 1. If the ratio is smaller than 0.1, the insulating layer 14b becomes too thin for obtaining a predetermined strength. If the ratio is over 1, the insulating layer 14b may have poor surface shape, causing pickup errors and resulting in poor mountability.

The surface roughness of the insulating layer 14b is preferably 2 $\mu$m or less in average. If the surface roughness exceeds 2 $\mu$m, pickup (suction) characteristics may degrade.

Moreover, the rigidity of the insulating layer 14b is preferably from 4H to 9H in the pencil hardness. If the rigidity of the insulating layer 14b is less than 4H, the conductive film 12 may not be securely protected, as described before. If the rigidity exceeds 9H, cracks may occur on the insulating layer 14b at pickup by suction.

The insulation resistance of the insulating layer 14b is preferably $10^{10}$ ohms·m (preferably $10^{12}$ ohms·m or above) or more. If the insulation resistance is smaller than $10^{10}$ ohms·m, the Q degrades. The thickness of the protective material 14 at a corner of the substrate 11 is at least 5 $\mu$m or above, and preferably 10 $\mu$m or above, and 50 $\mu$m or less.

By forming the terminals 15 and 16 directly on the substrate 11, as shown in FIG. 2, the bonding strength between the terminals 15 and 16 and the substrate 11 may be improved. However, the conductive film 12 may be formed to the end surface of the substrate 11, and the terminals 15 and 16 may be formed on the conductive film 12 at its end surface. In this configuration, the conductive film 12 relatively has a satisfactory surface so that the terminals 15 and 16 on the conductive film 12 achieve satisfactory characteristics. The thickness of the conductive film 12 is not included in lengths P1 to P8 of the terminals 15 and 16 in the following description.

Lengths P5 and P6 respectively of the terminals 15 and 16 in lengthwise direction of the substrate 11 preferably satisfy the next conditions when L1 indicates, as described before, the total length of the element:

0.07<P5/L1<0.35; and 0.07<P6/L1<0.35.

If both P5/L1 and P6/L1 are 0.07 or below, the bonding area of the element to an electrode on a circuit board becomes small. This may cause degraded bonding strength and the Manhattan defect. If the above ratio is 0.35 or above, the terminals 15 and 16 are too close to each other, causing short circuiting in some cases when the element is mounted on circuit boards.

The surface roughness of the terminals 15 and 16 is preferably from 0.3 $\mu$m to 10 $\mu$m (preferably from 0.5 $\mu$m to 3 $\mu$m). In other words, if the surface roughness of the terminals 15 and 16 is 0.3 $\mu$m or less, the bonding area to an electrode on a circuit board becomes small, reducing the bonding strength. If the surface roughness is 10 $\mu$m or above, characteristics of the conductive film may degrade when other films such as another conductive film is formed on the terminals 15 and 16.

Specific resistance of the terminals 15 and 16 may be set to $5\times10^{-4}$ ohms·cm or less (preferably $1\times10^{-4}$ ohms·cm or less) for improving electrical characteristics. Furthermore, particle diameter of a conductive material used for the terminals 15 and 16 is preferably from 1 to 5 $\mu$m (more preferably from 2 to 3 $\mu$m) when flake particle is used. For sphere particles, the diameter is preferably from 0.1 $\mu$m to 2.0 $\mu$m (more preferably from 0.2 $\mu$m to 1.0 $\mu$m).

Maximum thickness P1 and P2 respectively of the terminals 15 and 16 formed at the ends of the substrate 11 are preferably from 10 $\mu$m to 40 $\mu$m (more preferably from 20 $\mu$m to 35 $\mu$m). If P1 and P2 are 10 $\mu$m or less, the solder leaching time of the terminals 15 and 16 may shorten. This may cause solder leaching of the terminals 15 and 16 and then cause defective bonding between the element and circuit boards unless reflow process is completed in a short time at reflow soldering of the element mounted on circuit boards. This results in reducing the heating time in reflow process. If the heating time, such as in reflow soldering, is shortened, the bonding strength may degrade due to insufficient fusion of a bonding material which bonds the element and circuit boards.

Figure 10:
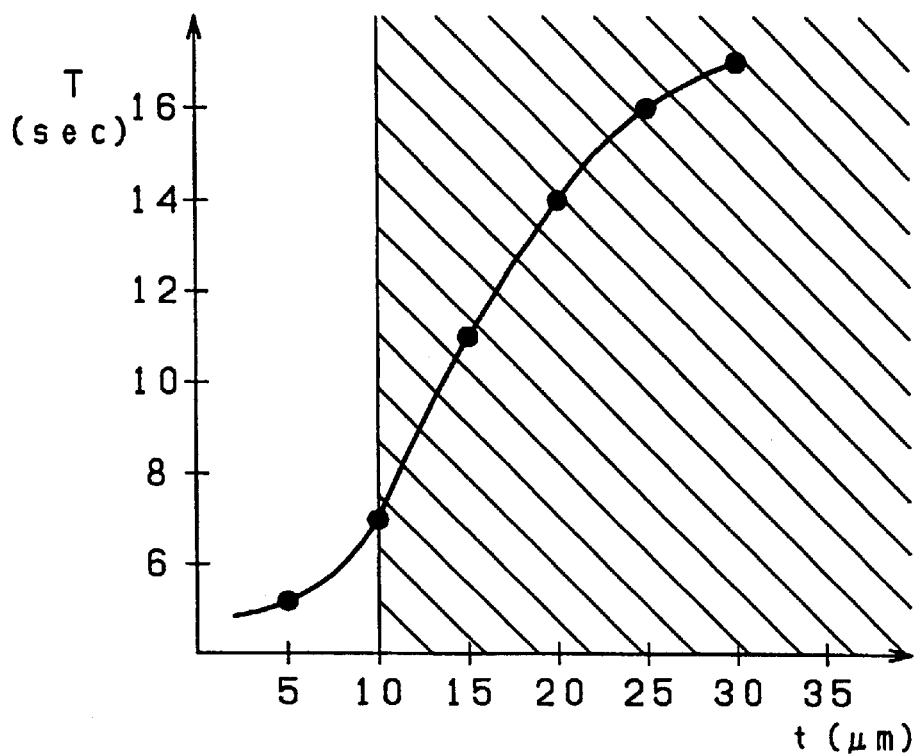
FIG. 10 is a graph illustrating the relation between a film thickness of a terminal of an electronic component and the occurrence of solder leaching in accordance with the preferred embodiment of the present invention.

FIG. 10 shows the relation between a solder leaching time T and lengths of P1 and P2 (t) in a dip soldering test (at 350° C.). It is apparent from FIG. 10 that solder leaching occurs in 7.5 sec or below when P1 and P2 is 10 μm or thinner. As mentioned above, if soldering time is reduced for preventing solder leaching, sufficient bonding strength is not achievable because fusion of the bonding material is insufficient. Accordingly, P1 and P2 are preferably 10 μm or above.

Figure 11:
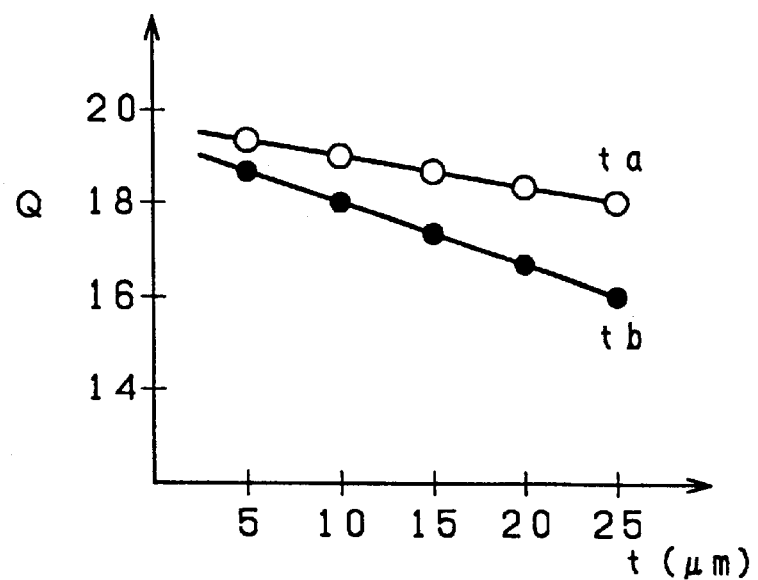
FIG. 11 is a graph illustrating the relation between the film thickness of the terminal of the inductor element and Q of the inductor element in the preferred embodiment of the present invention.

If P1 and P2 is 40 μm or above, the length of the substrate 11 needs to be shortened because the outer dimensions of finished products is fixed. This may degrade the Q. As shown in FIG. 11, if the lengths P1 and P2 is ta, the length of the substrate 11 naturally becomes shorter as ta increases, also degrading the Q. Accordingly, P1 and P2 are preferably 40 μm or less.

Furthermore, the maximum lengths P3 and P4 of the terminals 15 and 16 formed on the protective material 14 are preferably from 10 μm to 40 μm (more preferably from 15 μm to 30 μm). If P3 and P4 are 10 μm or less, as shown in FIG. 10, solder leaching occurs in a shorter time. In addition, as shown in FIG. 11, if P3 and P4 (tb in FIG. 11) are made thicker, the substrate 11 needs to be thinned, degrading the Q. Accordingly, P3 and P4 are preferably 40 μm or less. It is apparent from FIG. 11 that the Q value significantly drops, rather than ta, when tb increases. Accordingly, P3 and P4 are preferably made thinner than P1 and P2 for preventing degradation of the Q. More specifically, if P1 and P2 are 30 μm, P3 and P4 are preferably from 10 μm to 30 μm.

Lengths P7 and P8 of the terminals 15 and 16 formed on a corner of an end face of the substrate 11 is preferably from 7 μm to 38 μm. If P7 and P8 are less than 7 μm, solder leaching occurs in a shorter period. If P7 and P8 are thinner than P1 to P4, the terminals 15 and 16 on the corner are not protruded, enabling to improve mountability. In other words, P7 and P8 are preferably 38 μm or less. It is also preferable to suppress the occurrence of residues by making a cross section of the terminals 15 and 16 entirely round so that there is no corner on the terminals 15 and 16.

For increasing the weather resistance of the terminals 15 and 16 a corrosion resistance layer made of a metal with high corrosion resistance such as Ti, Ni, W, and Cr, or an alloy layer of these metals (e.g. Ni—Cr) may be formed on the terminals 15 and 16 in a thickness of 0.5 to 3 μm. In particular, providing of a single Ni or Ni alloy layer is advantageous with respect to characteristics and cost.

For improving bondabilty of the terminals 15 and 16 to circuit boards, a bonding layer of 5 to 30 μm made of solder or lead-free bonding material (such as lead-free solder of single Sn or Sn containing at least one of Ag, Cu, Zn, Bi, and In) may be formed on the terminals 15 and 16 or on the corrosion resistance layer.

In general, the lengths P1 to P8 related the terminals 15 and 16 of electronic components are determined on the premise that the corrosion resistance layer and bonding layer are formed on the terminals 15 and 16. If no corrosion resistance layer and bonding layer are formed, and only the terminals 15 and 16 are formed on a finished component, product dimensions are equivalent to the lengths P1 to P8. If at least one of the corrosion resistance layer and bonding layer is formed on the terminals 15 and 16, the thickness of the corrosion resistance layer or bonding layer is included in dimensions of P1 to P8. In other words, P1 to P8 are the total length of the laminated layers of the terminal 15 and 16 and at least one of the corrosion resistance layer and bonding layer.

One methods of making the terminals 15 and 16 is to apply conductive paste to the end faces of the substrate 11, and to form the terminals 15 and 16 by heat treatment or the like. A method for forming the terminals by applying paste is described next.

The conductive paste contains at least a conductive material, resin material, and solvent. For the conductive material, metal particles exhibiting conductivity such as gold, silver, copper, and nickel may be used. Silver particles are particularly advantageous with respect to characteristics, processibility, and cost. If flaked metal particles are used, their particle size is preferably from 1 to 5 μm (more preferably from 2 to 3 μm). If spherical particles are used, the particle size is preferably from 0.1 μm to 2.0 μm (more preferably from 0.2 μm to 0.5 μm). As for resin material, phenolic resin, acrylic resin, or epoxy resin may be used, and butyl carbitol or the like solvents are suitable as solvent.

The mixing ratio of the conductive paste is preferably 50 to 70 wt. % of conductive material, 10 to 20 wt. % of resin material, and 20 to 30 wt. % of solvent. A conditioning agent such as a viscosity conditioner may be added to this conductive paste.

The conductive paste as composed above is applied to the ends of the substrate 11 by dipping, by a roller coating, or the like. In the case dipping is used, the viscosity of the conductive paste is adjusted to about 10 to 30 Pa·s, and 20 to 50 Pa·s if a roller coating is used.

After applying conductive paste to the substrate 11, the substrate 11 is heat treated at temperatures from 150° C. to 230° C. for 30 to 60 minutes to form the terminals 15 and 16 with the dimensions P1 to P8 mentioned before. The corrosion resistance film or bonding film is then formed as required.

Furthermore, as shown in FIG. 2, heights Z1 and Z2 of the terminals 15 and 16 preferably satisfy the following condition:

|Z1|−Z2|<80 μm (preferably 50 μm).

If the height difference between Z1 and Z2 exceeds 80 μm, the element is pulled to one electrode by the surface tension such as of solder and erects when the element is mounted on a circuit board and heated such as by soldering. The height difference between Z1 and Z2 is more preferably 50 μm or below. The height difference more than 80 μm results in an extremely high possibility of causing the so-called "Manhattan defect". The Manhattan defect is described next with reference to FIG. 9.

Figure 9:
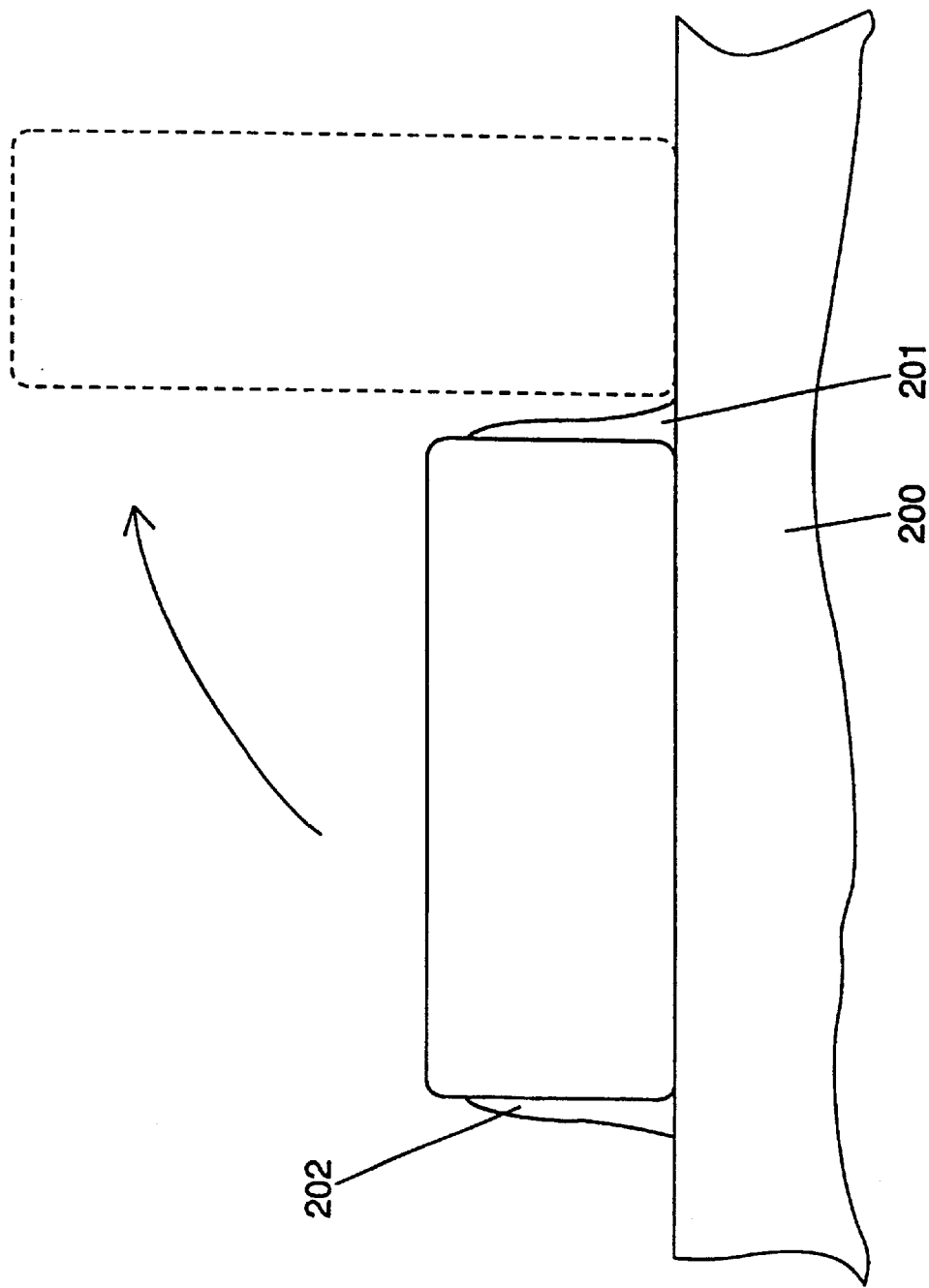
FIG. 9 illustrates a so-called "Manhattan defect."

As shown in FIG. 9, solders 201 and 202 are provided between each of the terminals of an element and a substrate 200 when the element is placed on the substrate 200. When the solders 201 and 202 are heated such as by a reflow furnace, the surface tension of the melted solders 201 and 202 may differ between the two terminals due to, for example, a difference in applied volumes and melting time. As a result, the element may rotate centered on one terminal, as shown in FIG. 9, and erects. This phenomenon is called a "Manhattan defect".

If the height difference between Z1 and Z2 exceeds 80 μm, the element may be disposed on the substrate 200 in a tilted manner, increasing the probability that the element will erect. The Manhattan defect occurs particularly frequently with small and light chip electronic components (including chip inductor elements).

The present invention focuses on the tilted placement of the element on the substrate 200 due to differences in height between the terminals 15 and 16 as one of the causes of the Manhattan defect. The occurrence of the Manhattan defect may thus be drastically suppressed by processing the terminals 15 and 16 to reduce the height difference between Z1 and Z2 to 80 µm or below (preferably 50 µm or below). In addition, the Manhattan defect can be largely suppressed by reducing the height difference between Z1 and Z2 to 50 µm or below.

The examples of the terminals 15 and 16 configurations are shown below.

(1) A conductor layer made by solidifying conductive paste containing silver or the like is applied directly on the end faces of the substrate;

(2) In (1), the conductive film 12 is provided up to the end faces of the substrate, and a conductor layer is provided on the conductive film 12;

(3) In (1) and (2), a corrosion resistance layer or bonding layer, or both are further provided on the conductor layer; or (4) The conductive film 12 is provided up to the end faces of the substrate, and at least one of the bonding layer and corrosion resistance layer formed on the conductive film 12 is used as the terminals 15 and 16.

The relation between the terminals 15 and 16 and a spiral conductive film 12 (coil) formed with the groove 13 is described next.

The length of the spiral conductive film 12 can be made longer by establishing the configuration that the terminals 15 and 16 and an end of the groove 13 face with the protective material 14 in between. This is effective for elements requiring high inductance. In other words, the surface of the coiled conductor layer formed with the groove 13 does not directly contact the terminals 15 and 16, but through the protective material 14, and directly contacts the terminals 15 and 16 only at the end of the conductive film 12. This makes it possible to increase the number of turns of the conductor to get higher inductance.

In the present embodiment, the terminals 15 and 16 are formed using conductive paste. The terminals 15 and 16 may also be formed by plating at least one of terminals, corrosion resistance layer, and bonding layer. In addition, in the present embodiment, the terminals 15 and 16 are formed on an entire end face of the substrate 11. However, at least a portion of the terminals on the end face of the substrate 11 may be removed to provide a so-called 'fillet-less' electronic component.

A method for manufacturing the inductor element as configured above is described next.

First, the pillar shape substrate 11 for several to some tens of elements is made of an insulating material such as alumina by pressing or extrusion. The conductive film 12 is then formed on almost the entire surface of the substrate 11 by plating, sputtering, or the like. Then, a number of spiral grooves 13 are provided at a predetermined interval on the substrate 11 on which the conductive film 12 is formed. The substrate 11 is cut between the spiral groove 13 to complete a semi-finished element having the conductive film 12 and groove 13 on the substrate 11.

The groove 13 is created by a laser cutting or by a machine cutting. Lasers are ideal for mass production, and thus a laser processing is described next.

First, the substrate 11 is placed on a rotary apparatus. A laser beam is applied to the substrate 11 while rotating the substrate 11 to remove a part of the conductive film 12 and the surface of the substrate 11, thus creating a spiral groove. Here, a YAG laser, excimer laser, gas laser, or the like may be used, and the laser beam is applied to the substrate 11 by focusing the laser beam using lenses. The depth of the groove 13 is controllable by adjusting the power of the laser beam, and the width of the groove 13 is controllable by adjusting the lens that focuses the laser beam. The laser absorption rate depends on the materials of the conductive film 12, and thus the type of laser (laser wavelength) is preferably selected to match the material of the conductive film 12. The groove 13 may also be formed using a whetstone instead of a laser.

After forming the groove 13, an electro-deposited film 14a is formed on the conductive film 12, such as by electro-deposition, and then the insulating layer 14b is formed to provide the protective material 14 on the substrate 11 except for both end surfaces (i.e. the side surfaces of the substrate 11).

Next, conductive paste is applied to both end faces of the substrate 11, and heat treated, plated, or the like to form the terminals 15 and 16. A finished element is completed at this stage; however, the corrosion resistance layer or bonding layer is provided additionally in accordance with specifications.

The preferred embodiment of the present invention describes the case of the inductor element. However, the same effects are achievable for other electronic components in which the conductive film is formed on the insulated substrate. A small chip resistor can be manufactured by using the conductive film 12 as a resistor film. A chip capacitor can be also manufactured by providing a ring groove instead of a spiral groove 13 on the conductive film 12 for dividing the conductive film 12 into at least two parts.

Figure 12:
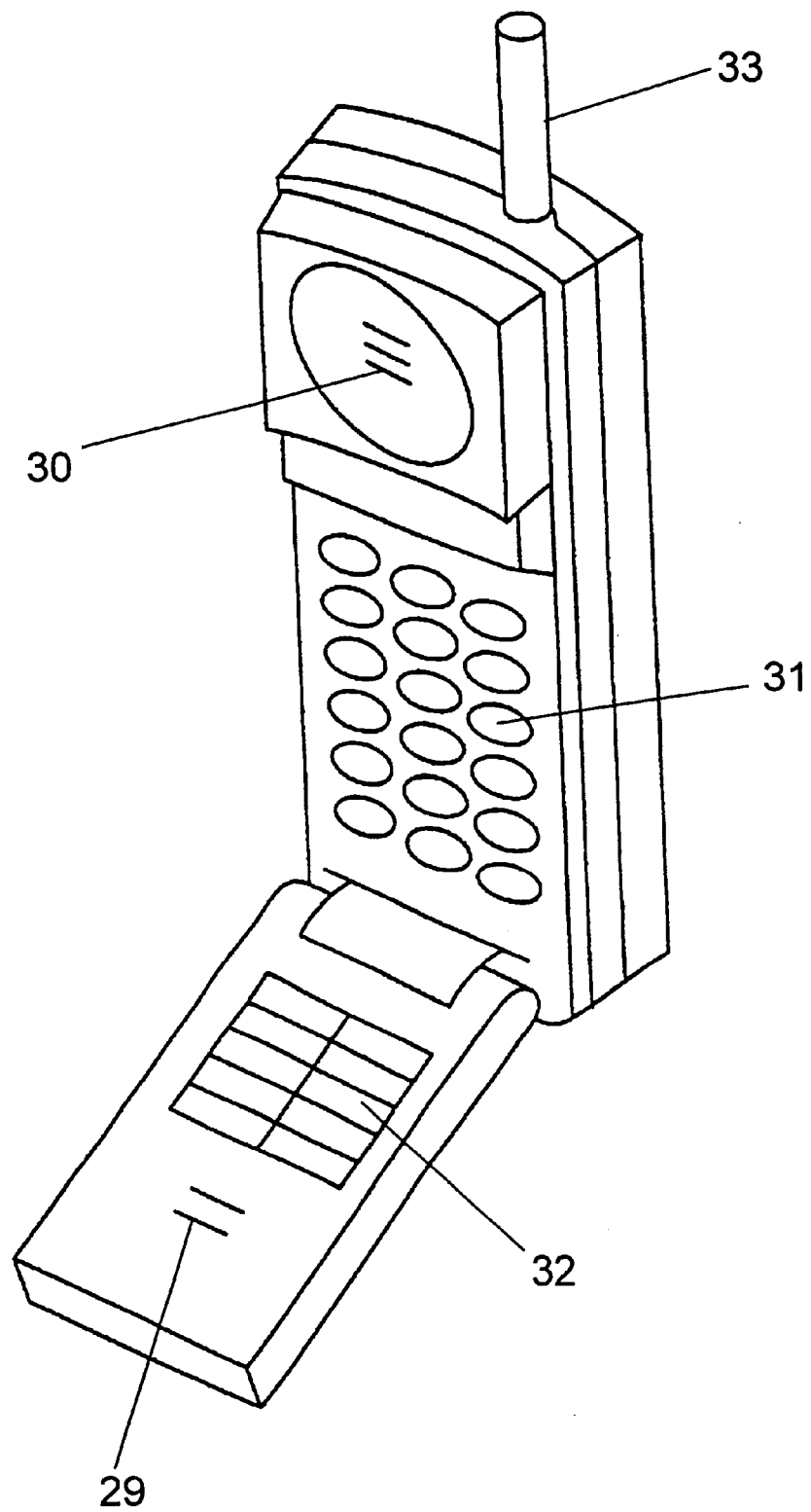
FIG. 12 is a perspective of a radio terminal in accordance with a preferred embodiment of the present invention.
Figure 13:
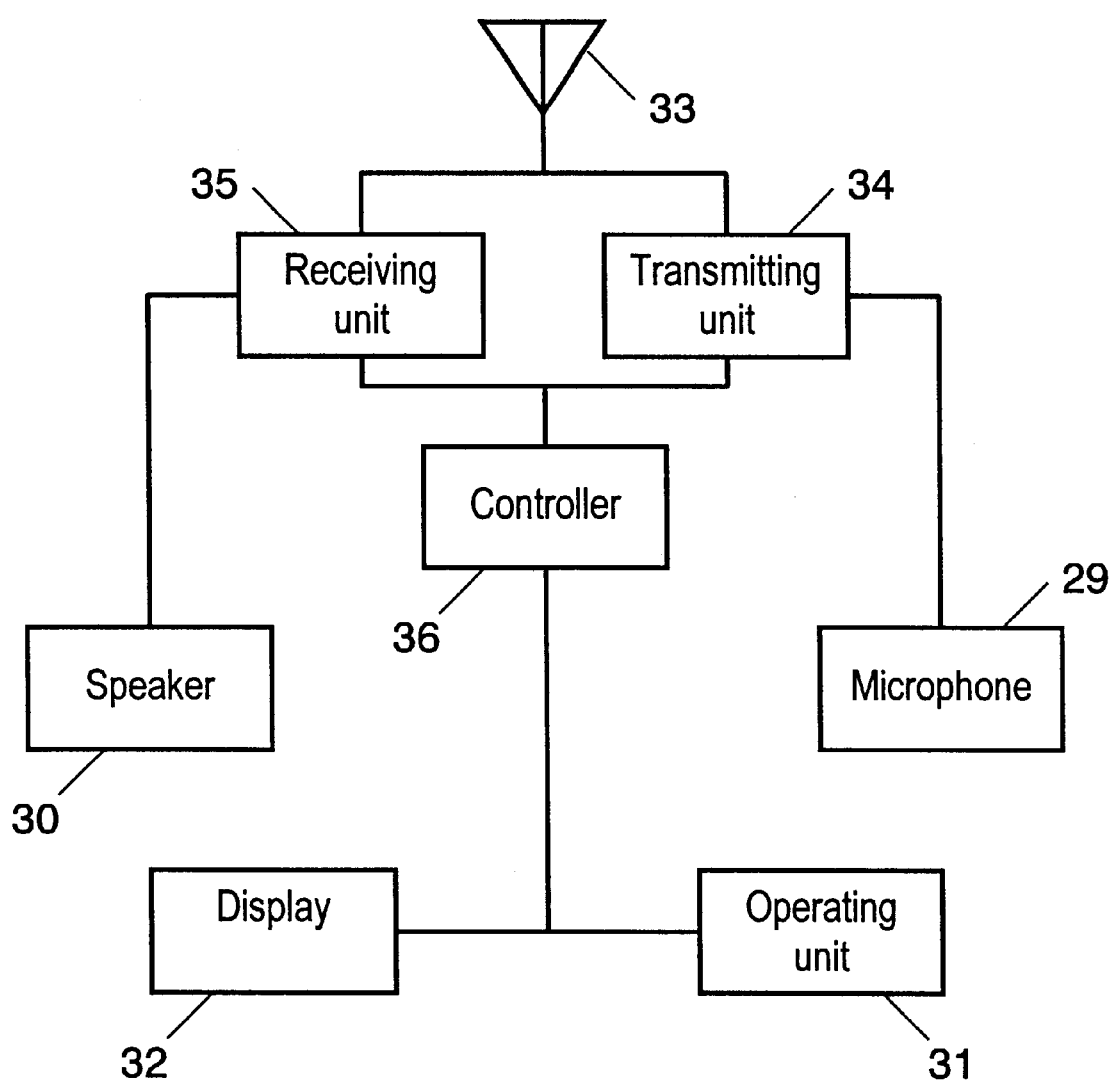
FIG. 13 is a block diagram of the radio terminal in accordance with the preferred embodiment of the present invention.

FIG. 12 is a perspective and FIG. 13 is a block diagram of a radio terminal in a preferred embodiment of the present invention. In FIGS. 12 and 13, the radio terminal comprises a microphone 29 for converting sound to audio signals; a speaker 30 for converting audio signals to sound; a control panel 31 comprising dial buttons or the like; a display 32 which displays incoming calls; an antenna 33; and a transmitting unit 34 for demodulating and converting audio signals from the microphone 29 to transmitting signals. The transmitting signals generated in the transmitting unit 34 are transmitted via the antenna 33. The radio terminal also comprises a receiving unit 35 for converting received signals to audio signals, and audio signals from the receiving unit 35 are converted to sound by the speaker 30. A controller 36 controls the transmitting unit 34, receiving unit 35, control panel 31, and display 32.

An example of its operation is described below.

When the radio terminal receives a call, the receiving unit 35 outputs the incoming call signal to the controller 36. The controller 36 displays predetermined characters or the like on the display 32 in response to the incoming call signal. When the user presses a button on the control panel 31 to accept the call, signals are sent to the controller 36 to set the receiving mode to each part. In other words, signals received at the antenna 33 are converted to audio signals at the receiving unit 35, and audio signals are output from the speaker 30 as a sound, and at the same time, sound input to the microphone 29 is converted to audio signals, and transmitted to outside through the transmitting unit 34 and antenna 33.

Transmitting operation is described next.

For transmitting signals, signals for transmittance is first input to the controller 36 using the control panel 31. Then, signals corresponding to a phone number is sent from the control panel 31 to the controller 36, making the controller 36 to send the signals corresponding to the phone number outside from the antenna 33 through the transmitting unit 34.

After a communication line is established between a receiver by the transmittance signals, the establishment of the communication line is informed to the controller 36 through the antenna 33 and receiving unit 35, and then the controller 36 sets the transmitting mode to each part.

In other words, signals received at the antenna 33 are converted to audio signals at the receiving unit 35, audio signals are output from the speaker 30 as sound, and at the same time sound input to the microphone 29 is converted to audio signals, and transmitted to outside through the transmitting unit 34 and antenna 33.

The present embodiment describes the case of sending and receiving sound. However, it is apparent that the present invention is not limited to sending and receiving sound. The same effects are achievable in apparatuses at least sending or receiving data other than sound, such as text data.

The electronic component of the present invention (illustrated in FIGS. 1 to 11) is used at least in one of an oscillating circuit, filter circuit, antenna circuit, matching circuits between every stages, and their peripheral circuits where high Q is required. For example, several to 40 electronic components of the present invention are used in one radio terminal. By the use of the electronic component of the present invention, a circuit board inside the apparatus can be made smaller and degradation of characteristics of the electronic component when mounted on a circuit board is preventable. Accordingly, the defect rate of circuit boards can be markedly reduced, enabling the manufacturing of radio terminals with significantly better productivity.

What is claimed is:

1. An electronic component comprising:
   a substrate;
   a conductive film spirally wound on said substrate; and
   a pair of terminals disposed on both end surfaces of said substrate;
   wherein a length L1 of said electronic component in a direction that said pair of terminals face each other (lengthwise direction), lengths P5 and P6 of each cross section of said pair of terminals in the lengthwise direction have a relationship of:
   $0.07 < P5/L1 < 0.35$,
   $0.07 < P6/L1 < 0.35$; and
   a center line average surface roughness of said terminals ranges from 0.3 $\mu$m to 10 $\mu$m.

2. The electronic component as defined in claim 1, wherein at least one of a corrosion resistance layer and bonding layer is further formed on said terminals.

3. The electronic component as defined in claim 1, wherein said terminals are formed of conductive paste.

4. The electronic component as defined in claim 1, wherein a cross section of said substrate is an approximate square.

5. The electronic component as defined in claim 1, wherein a length L1, width L2, and height L3 of said electronic component have a relationship of:
   L1=0.2–2.0 mm (preferably 0.3–0.8 mm);
   L2=0.1–1.0 mm (preferably 0.1–0.4 mm); and
   L3=0.1–1.0 mm (preferably 0.1–0.4 mm).

6. The electronic component as defined in claim 1, further comprising a groove created on said conductive film, wherein a protective material is provided to cover said groove.

7. The electronic component as defined in claim 6, wherein said terminals are disposed from an end face of said substrate to said protective material provided on a side surface of said substrate, and said protective material is interposed between said terminal and said conductive film.

8. The electronic component as defined in claim 7, wherein said terminals and an end of said groove face through said protective material.

9. The electronic component as defined in claim 7, wherein an end of said groove at a side of said terminals and said terminals face through said protective material.

10. The electronic component as defined in claim 6, wherein said protective material comprises an electro-deposited film disposed on said conductive film and an insulating layer disposed on said electro-deposited film.

11. The electronic component as defined in claim 10, wherein a film thickness of said electro-deposited film is from 10 $\mu$m to 30 $\mu$m.

12. The electronic component as defined in claim 10, wherein a film thickness of said insulating layer is from 5 $\mu$m to 20 $\mu$m.

13. The electronic component as defined in claim 10, wherein a ratio of a thickness of said electro-deposited film and a thickness of said insulating layer is from 0.1 to 1.0.

14. The electronic component as defined in claim 10, wherein said electro-deposited film is made of at least one of acrylic resin, epoxy resin, fluorocarbon resin, urethane resin, and polyimide resin.

15. The electronic component as defined in claim 10, wherein said insulating layer is made of at least one of epoxy resin and acrylic resin.

16. The electronic component as defined in claim 10, wherein a rigidity of said insulating layer is greater than a rigidity of said electro-deposited film.

17. The electronic component as defined in claim 1, wherein said electronic component is an inductor.

18. The electronic component as defined in claim 1, wherein said electronic component is a resistor.

19. The electronic component as defined in claim 1, wherein said electronic component has a groove at least dividing said conductive film into two parts.

20. The electronic component as defined in claim 1, wherein said conductive film is also provided on an end surface of said substrate, and said terminals are disposed on said end surface through said conductive film.

21. An electronic component comprising:
   a substrate;
   a conductive film spirally wound on said substrate; and
   a pair of terminals disposed on both end surfaces of said substrate,
   wherein length L1 of said electronic component in a direction that said pair of terminals face each other (lengthwise direction), lengths P5 and P6 of each cross-section of said pair of terminals in the lengthwise direction have a relationship of:
   $0.07 < P5/L1 < 0.35$,
   $0.07 < P6/L1 < 0.35$; and
   a conductive material configuring said terminals is a flaked material, said flaked material having a particle size from 1 $\mu$m to 5 $\mu$m.

22. The electronic component as defined in claim 21, wherein length L1, width L2, and height L3 of said electronic component have a relationship of:
   L1=0.2 to 2.0 mm (preferably, 0.3 to 0.8 mm)
   L2=0.1 to 1.0 mm (preferably, 0.1 to 0.4 mm)
   L3=0.1 to 1.0 mm (preferably, 0.1 to 0.4 mm).

23. The electronic component as defined in claim 21, wherein said terminals are formed by using conductive paste.

24. The electronic component as defined in claim 21, wherein said electronic component has mainly inductance.

25. An electronic component comprising:

a substrate;

a conductive film spirally wound on said substrate; and a pair of terminals disposed on both end surfaces of said substrate, wherein length L1 of said electronic component in a direction that said pair of terminals face each other (lengthwise direction), lengths P5 and P6 of each cross-section of said pair of terminals in the lengthwise direction have a relationship of:

0.07<P5/L1<0.35, 0.07<P6/L1<0.35; and materials configuring said substrate and said terminals are spherical materials, said spherical materials having a particle size from 0.1 μm to 2.0 μm.

26. The electronic component as defined in claim 25, wherein length L1, width L2, and height L3 of said electronic component have a relationship of:

L1=0.2 to 2.0 mm (preferably, 0.3 to 0.8 mm)

L2=0.1 to 1.0 mm (preferably, 0.1 to 0.4 mm)

L3=0.1 to 1.0 mm (preferably, 0.1 to 0.4 mm).

27. The electronic component as defined in claim 25, wherein a cross-section of said substrate is approximately square.

28. The electronic component as defined in claim 25, wherein said electronic component has mainly inductance.

29. An electronic component comprising:

a substrate;

a conductive film spirally wound on said substrate; and a pair of terminals disposed on both end surfaces of said substrate, wherein length L1 of said electronic component in a direction that said pair of terminals face each other (lengthwise direction), lengths P5 and P6 of each cross-section of said pair of terminals in the lengthwise direction have a relationship of:

0.07<P5/L1<0.35, 0.07<P6/L1<0.35; and a thickness of said terminals at said end surface of said substrate is from 10 μm to 40 μm.

30. The electronic component as defined in claim 29, wherein length L1, width L2, and height L3 of said electronic component have a relationship of:

L1=0.2 to 2.0 mm (preferably, 0.3 to 0.8 mm)

L2=0.1 to 1.0 mm (preferably, 0.1 to 0.4 mm)

L3=0.1 to 1.0 mm (preferably, 0.1 to 0.4 mm).

31. The electronic component as defined in claim 29, wherein said electronic component has mainly inductance.

32. An electronic component comprising:

a substrate;

a conductive film spirally wound on said substrate;

a pair of terminals disposed on both end surfaces of said substrate, wherein length L1 of said electronic component in a direction that said pair of terminals face each other (lengthwise direction), lengths P5 and P6 of each cross-section of said pair of terminals in the lengthwise direction have a relationship of:

0.07<P5/L1<0.35, 0.07<P6/L1<0.35; and said terminals are disposed on said end surface of said substrate and on a side face adjacent to said end surface, and a thickness of said terminals formed on said side surface is from 10 μm to 40 μm.

33. The electronic component as defined in claim 32, wherein length L1, width L2, and height L3 of said electronic component have a relationship of:

L1=0.2 to 2.0 mm (preferably, 0.3 to 0.8 mm)

L2=0.1 to 1.0 mm (preferably, 0.1 to 0.4 mm)

L3=0.1 to 1.0 mm (preferably, 0.1 to 0.4 mm).

34. The electronic component as defined in claim 32, wherein protective material is provided to cover a groove between said spirally wound conductive film.

35. The electronic component as defined in claim 34, wherein said terminals are disposed from an end surface of said substrate to said protective material provided on a side surface of said substrate, and said protective material is interposed between said terminal and said conductive film.

36. The electronic component as defined in claim 35, wherein said terminals and an endmost portion of said groove are opposed to each other via said protective material.

37. The electronic component of claim 36, wherein an end portion of said groove at the terminal side and said terminal are opposed to each other via said protective material.

38. The electronic component as defined in claim 32, wherein said electronic component has mainly inductance.

39. An electronic component comprising:

a substrate;

a conductive film spirally wound on said substrate; and a pair of terminals disposed on both end surfaces of said substrate, wherein length L1 of said electronic component in a direction that said pair of terminals face each other (lengthwise direction), lengths P5 and P6 of each cross-section of said pair of terminals in the lengthwise direction have a relationship of:

0.07<P5/L1<0.35, 0.07<P6/L1<0.35; and at least one of a corrosion resistance layer and a bonding layer is further formed on said terminals.

40. The electronic component as defined in claim 39, wherein said conducting film is also provided on an end surface of said substrate, and said terminals are disposed on said end surface through said conducting film.

41. An electronic component comprising:

a substrate;

a conductive film spirally wound on said substrate; and a pair of terminals disposed on both end surfaces of said substrate, wherein length L1 of said electronic component in a direction that said pair of terminals face each other (lengthwise direction), lengths P5 and P6 of each cross-section of said pair of terminals in the lengthwise direction have a relationship of:

0.07<P5/L<0.35

0.07<P6/L1<0.35 and a protective material is provided to cover a groove between said spirally wound conductive film, and said protective material comprises an electro-deposited film disposed on said conductive film and an insulating layer disposed on said electro-deposited film, and a thickness of said electro-deposited film is from 10 to 30 μm, and a thickness of said insulating layer is from 5 to 20 μm, and a ratio of thickness of said electro-deposited film and thickness of said insulating layer is from 0.1 to 1.0.

42. The electronic component as defined in claim 41, wherein said electro-deposited film is made of at least one of acrylic resin, epoxy resin, fluorocarbon resin, urethane resin, and polyimide resin.

43. The electronic component as defined in claim 41, wherein said insulating layer is made of at least one of epoxy resin and acrylic resin.

44. The electronic component as defined in claim 41, wherein hardness of said insulating layer is greater than hardness of said electro-deposited film.

45. An electronic component comprising:
a substrate;
a resistance layer disposed on said substrate;
a groove formed in said resistance layer; and
a pair of terminals disposed on both end surfaces of said substrate,
wherein length L1 of said electronic component in a direction that said pair of terminals face each other (lengthwise direction), lengths P5 and P6 of each cross-section of said pair of terminals in the lengthwise direction have a relationship of:
$0.07<P5/L1<0.35$
$0.07<P6/L1<0.35$.

46. An electronic component comprising:
a substrate;
a conductive film disposed on said substrate;
a groove formed in said conductive film, said groove divides at least said conductive film into two parts; and
a pair of terminals disposed on both end surfaces of said substrate,
wherein length L1 of said electronic component in a direction that said pair of terminals face each other (lengthwise direction), lengths P5 and P6 of each cross-section of said pair of terminals in the lengthwise direction have a relationship of:
$0.07<P5/L1<0.35$
$0.07<P6/L1<0.35$.

47. A wireless terminal comprising:
a display device;
a signal converter;
an antenna; and
a controller,
wherein, an electronic component is used in at least one of an oscillating circuit, filter circuit, antenna circuit, and matching circuit for connecting each of said circuits and its peripheral circuits, said electronic component comprising:
a substrate;
a conductive film spirally wound on said substrate; and
a pair of terminals disposed on both end surfaces of said substrate;
wherein length L1 of said electronic component in a direction that said pair of terminals face each other (lengthwise direction), lengths P5 and P6 of each cross-section of said pair of terminals in the lengthwise direction have a relationship of:
$0.07<P5/L1<0.35$,
$0.07<P6/L1<0.35$; and
a center line average surface roughness of said terminals is from 0.3 $\mu$m to 10 $\mu$m.

48. A wireless terminal comprising:
a display device;
a signal converter;
an antenna; and
a controller;
wherein, an electronic component is used in at least one of an oscillating circuit, filter circuit, antenna circuit, and matching circuit for connecting each of said circuits and its peripheral circuits, said electronic component comprising:
a substrate;
a conductive film spirally wound on said substrate; and
a pair of terminals disposed on both end surfaces of said substrate,
wherein length L1 of said electronic component in a direction that said pair of terminals face each other (lengthwise direction), lengths P5 and P6 of each cross-section of said pair of terminals in the lengthwise direction have a relationship of:
$0.07<P5/L1<0.35$,
$0.07<P6/L1<0.35$; and
a conductive material configuring said terminals is a flaked material, and its particle size is from 1 $\mu$m to 5 $\mu$m.

49. A wireless terminal comprising:
a display device;
a signal converter;
an antenna; and
a controller;
wherein, an electronic component is used in at least one of an oscillating circuit, filter circuit, antenna circuit, and matching circuit for connecting each of said circuits and its peripheral circuits, said electronic component comprising:
a substrate;
a conductive film spirally wound on said substrate; and
a pair of terminals disposed on both end surfaces of said substrate,
wherein length L1 of said electronic component in a direction that said pair of terminals face each other (lengthwise direction), lengths P5 and P6 of each cross-section of said pair of terminals in the lengthwise direction have a relationship of:
$0.07<P5/L1<0.35$,
$0.07<P6/L1<0.35$; and
materials configuring said substrate and said terminals are spherical in shape, and their particle size is from 0.1 $\mu$m to 2.0 $\mu$m.

50. A wireless terminal comprising:
a display device;
a signal converter;
an antenna; and
a controller;
wherein, an electronic component is used in at least one of an oscillating circuit, filter circuit, antenna circuit, and matching circuit for connecting each of said circuits and its peripheral circuits, said electronic component comprising:
a substrate;
a conductive film spirally wound on said substrate; and
a pair of terminals disposed on both end surfaces of said substrate,
wherein length L1 of said electronic component in a direction that said pair of terminals face each other (lengthwise direction), lengths P5 and P6 of each cross-section of said pair of terminals in the lengthwise direction have a relationship of:
$0.07<P5/L1<0.35$,
$0.07<P61 L1<0.35$; and film thickness of said terminals at said end surface of said substrate is from 10 μm to 40 μm.

51. A wireless terminal comprising:

a display device;

a signal converter;

an antenna; and a controller;

wherein, an electronic component is used in at least one of an oscillating circuit, filter circuit, antenna circuit, and matching circuit for connecting each of said circuits and its peripheral circuits, said electronic component comprising:

a substrate;

a conductive film spirally wound on said substrate; and a pair of terminals disposed on both end surfaces of said substrate, wherein length L1 of said electronic component in a direction that said pair of terminals face each other (lengthwise direction), lengths P5 and P6 of each cross-section of said pair of terminals in the lengthwise direction have a relationship of:

0.07<P5/L1<0.35, 0.07<P6/L1<0.35; and said terminals are disposed on said end surface of said substrate and on a side surface adjoining said end surface, and a thickness of said terminals formed on said side surface is from 10 μm to 40 μm.

52. A wireless terminal comprising:

a display device;

a signal converter;

an antenna; and a controller;

wherein, an electronic component is used in at least one of an oscillating circuit, filter circuit, antenna circuit, and matching circuit for connecting each of said circuits and its peripheral circuits, said electronic component comprising:

substrate;

a conductive film spirally wound on said substrate; and a pair of terminals disposed on both end surfaces of said substrate, wherein length L1 of said electronic component in a direction that said pair of terminals face each other (lengthwise direction), lengths P5 and P6 of each cross-section of said pair of terminals in the lengthwise direction have a relationship of:

0.07<P5/L1<0.35, 0.07<P6/L1<0.35; and said conductive film is also disposed on said end surface of said substrate, and said terminals are disposed via the conductive film on said end surface, and further, at least one of anticorrosive layer and bonding layer is formed on said terminals.

* * * * *